(12) United States Patent
Hayasaka

(10) Patent No.: US 11,620,739 B2
(45) Date of Patent: *Apr. 4, 2023

(54) IMAGE GENERATION DEVICE, IMAGE GENERATION METHOD, AND STORAGE MEDIUM STORING PROGRAM

(71) Applicant: NEC CORPORATION, Tokyo (JP)

(72) Inventor: Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 17/108,284

(22) Filed: Dec. 1, 2020

(65) Prior Publication Data
US 2021/0082097 A1  Mar. 18, 2021

Related U.S. Application Data

(63) Continuation of application No. 16/579,951, filed on Sep. 24, 2019, now Pat. No. 10,878,549, which is a
(Continued)

(51) Int. Cl.
*G06T 5/50* (2006.01)
*G06T 7/12* (2017.01)
(Continued)

(52) U.S. Cl.
CPC .................. *G06T 5/50* (2013.01); *G06T 1/00* (2013.01); *G06T 7/12* (2017.01); *G06V 40/165* (2022.01); *G06V 40/171* (2022.01); *H04N 1/387* (2013.01)

(58) Field of Classification Search
CPC .... G06T 5/50; G06T 1/00; G06T 7/12; G06T 11/60; G06T 2207/30201; G06T 7/11;
(Continued)

(56) References Cited

U.S. PATENT DOCUMENTS 7,024,054 B2  4/2006  Cahill et al.
8,290,253 B1  10/2012  Wang et al.
(Continued)

FOREIGN PATENT DOCUMENTS

JP  08-96111 A   4/1996
JP  2006-139681 A  6/2006
(Continued)

OTHER PUBLICATIONS

International Search Report of PCT/JP2016/085034 dated Jan. 10, 2017 [PCT/ISA/210].
(Continued)

*Primary Examiner* — Michael S Osinski

(57) ABSTRACT

An image generation device includes: at least one memory storing a set of instructions; and at least one processor configured to execute the set of instructions to: select a second face image from a plurality of face images stored in advance based on directions of faces included in the plurality of face images and a direction of a face included in an input first face image; deform the second face image based on feature points of the face included in the first face image and feature points of a face included in the second face image such that a face region of the second face image matches a face region of the first face image; and generate a third face image in which the face region of the first face image is synthesized with a region other than the face region of the deformed second face image.

20 Claims, 18 Drawing Sheets

Related U.S. Application Data continuation of application No. 16/349,129, filed as application No. PCT/JP2016/085034 on Nov. 25, 2016, now Pat. No. 10,846,838.

(51) Int. Cl.
  *G06T 1/00*  (2006.01)
  *H04N 1/387*  (2006.01)
  *G06V 40/16*  (2022.01)

(58) Field of Classification Search
  CPC ........... G06T 11/00; G06T 2207/20081; G06T 11/001; G06T 13/40; G06T 2207/20221; G06T 3/0093; G06T 13/80; G06T 15/04; G06T 19/00; G06T 19/20; G06V 40/165; G06V 40/171; G06V 40/161; G06V 40/168; G06V 40/167; G06V 10/56; G06V 40/16; G06V 10/7557; G06V 40/174; G06V 10/10; G06V 10/42; G06V 40/176; G06V 10/754; H04N 1/387
  See application file for complete search history.

(56) References Cited

U.S. PATENT DOCUMENTS

| | | | |
|---|---|---|---|
| 10,158,797 B2 * | 12/2018 | Baghert | H04N 5/265 |
| 10,528,798 B2 | 1/2020 | Shen et al. | |
| 10,540,540 B2 * | 1/2020 | Rhee | G06V 40/171 |
| 10,559,062 B2 * | 2/2020 | Kim | G06V 40/176 |
| 10,599,914 B2 | 3/2020 | Li et al. | |
| 10,653,962 B2 | 5/2020 | Gadre et al. | |
| 10,733,699 B2 * | 8/2020 | Wang | G06V 30/194 |
| 2003/0095701 A1 | 5/2003 | Shum et al. | |
| 2008/0089560 A1 | 4/2008 | Li et al. | |
| 2008/0144891 A1 | 6/2008 | Hwang et al. | |
| 2008/0187175 A1 | 8/2008 | Kim et al. | |
| 2009/0087036 A1 | 4/2009 | Imaoka | |
| 2009/0220149 A1 | 9/2009 | Menadeva et al. | |
| 2009/0262989 A1 | 10/2009 | Kozakaya | |
| 2010/0202697 A1 | 8/2010 | Matsuzaka et al. | |
| 2010/0328307 A1 | 12/2010 | Lim | |
| 2012/0129605 A1 | 5/2012 | Livet et al. | |
| 2012/0154684 A1 | 6/2012 | Luo et al. | |
| 2012/0299945 A1 | 11/2012 | Aarabi | |
| 2013/0033487 A1 | 2/2013 | Han et al. | |
| 2013/0328869 A1 | 12/2013 | Choi et al. | |
| 2014/0306982 A1 | 10/2014 | Ollivier | |
| 2015/0117786 A1 | 4/2015 | James et al. | |
| 2016/0196665 A1 | 7/2016 | Abreu et al. | |
| 2016/0198145 A1 | 7/2016 | Lee | |
| 2017/0154470 A1 | 6/2017 | Zhang | |
| 2017/0345146 A1 | 11/2017 | Fan et al. | |
| 2018/0288311 A1 | 10/2018 | Baghert et al. | |
| 2019/0035149 A1 | 1/2019 | Chen et al. | |
| 2019/0122404 A1 | 4/2019 | Freeman et al. | |
| 2019/0171869 A1 | 6/2019 | Fortune et al. | |
| 2019/0385318 A1 | 12/2019 | Tomaru et al. | |

FOREIGN PATENT DOCUMENTS

| | | |
|---|---|---|
| JP | 2006-343791 A | 12/2006 |
| JP | 2008-310392 A | 12/2008 |
| JP | 2010-086178 A | 4/2010 |
| JP | 2010-160826 A | 7/2010 |
| JP | 2010-171676 A | 8/2010 |
| JP | 2010-183317 A | 8/2010 |
| JP | 2011-209116 A | 10/2011 |
| JP | 2011-223173 A | 11/2011 |
| JP | 2012-073782 A | 4/2012 |
| JP | 2013-257844 A | 12/2013 |
| JP | 2014-211895 A | 11/2014 |
| JP | 2016-062225 A | 4/2016 |
| WO | 2017/020789 A1 | 2/2007 |
| WO | 2007020789 A1 | 2/2007 |
| WO | 2014/207991 A1 | 12/2014 |

OTHER PUBLICATIONS

Written Opinion of PCT/JP2016/085034 dated Jan. 10, 2017 [PCT/ISA/237].

Communication dated Nov. 4, 2020 by the Japanese Patent Office in application No. 2018-552360.

Japanese Office Action for JP Application No. 2021-016375 dated Feb. 15, 2022 with English Translation.

* cited by examiner (a)　　　　　　　　(b)

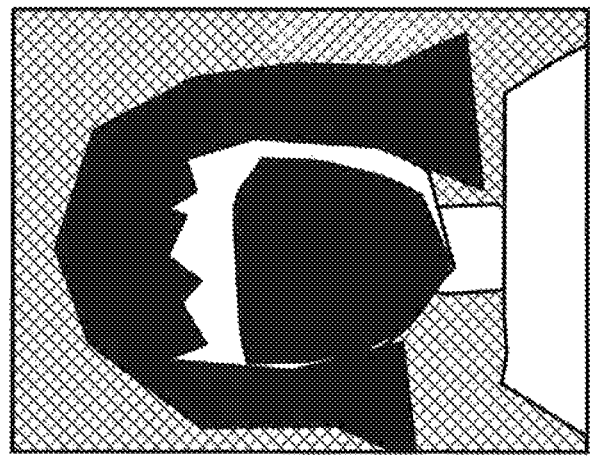
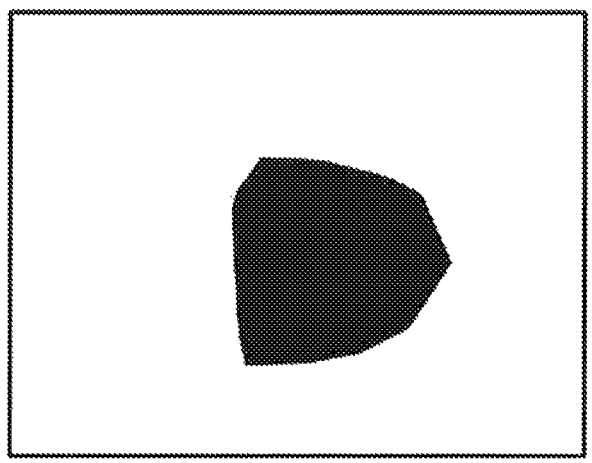
Fig. 10

IMAGE GENERATION DEVICE, IMAGE GENERATION METHOD, AND STORAGE MEDIUM STORING PROGRAM

CROSS-REFERENCE TO RELATED APPLICATIONS

This application is a continuation of U.S. application Ser. No. 16/579,951 filed Sep. 24, 2019, which is a Continuation of U.S. application Ser. No. 16/349,129 filed May 10, 2019, which is a National Stage of International Application No. PCT/JP2016/085034, filed Nov. 25, 2016, the disclosures of which are hereby incorporated by reference in their entireties.

TECHNICAL FIELD

The present disclosure relates to a technology for generating a synthetic image.

BACKGROUND ART

There are increasing demands for a technology for synthesizing images of people's faces (hereinafter, also referred to as "face images") with other images.

For example, in a face authentication technology for identifying an individual using face images, as a method for improving authentication performance, there is a method for preparing a large number of face images of the individual. However, it is difficult to collect images of the same person under various circumstances or collect images of the same person with various types of appearance (for example, poses, clothes, and hairstyles). Furthermore, for example, in order to improve the performance of recognition (or authentication) of a person wearing a special (or rare) clothing such as a national costume, it may be preferable to prepare face images of various persons wearing the special clothing. However, since the persons wearing the special clothing are not many, it is very difficult to collect a large number of face images of various persons wearing the special clothing. In this regard, a technology for acquiring images in which individuals, clothing and the like are variously combined by synthesizing face images with other images may be useful. That is, it is expected that the accuracy of face authentication is improved by generating synthetic images with abundant variation and using the generated images as teacher data.

Furthermore, for example, generating an image by taking a picture of a person and changing the person's hairstyle or attaching any decorative objects is convenient in easily enjoying the shape or finding hairstyles or decorative objects matching the person because there is no need to be changed.

Several techniques have been proposed to generate a new image by synthesizing an image of a person captured in an image.

Patent Literature 1 discloses an image synthesis device that selects a face image for synthesis corresponding to the face direction and facial expression of a captured subject from face images for synthesis prepared in advance and generates an image in which a face part of the subject has been replaced with the face image for synthesis.

Patent Literature 2 discloses a method for generating teaching data for identifying a state of a crowd. In this method, for example, a device synthesizes a background image not including a person with an image of the person so as to acquire teaching data with an appropriate label on the basis of an instruction of an operator.

Patent Literature 3 discloses a composition method in which image data of hairstyles, face components, wearing articles and the like is prepared and image data appropriately deformed is synthesized with an input image, so that an image, in which different hairstyles and the like are synthesized with a person captured in the input image, is generated.

Patent Literature 4 discloses an image generation device that generates a face image assuming various angles and illumination environments by using a three-dimensional face model and a plurality of light models.

As a literature associated with the present disclosure, there is Patent Literature 5 that discloses a direction recognition apparatus that recognizes a direction of an object.

CITATION LIST

Patent Literature

[PTL 1] Japanese Unexamined Patent Application Publication No. 2010-86178
[PTL 2] International Publication No. 2014/207991
[PTL 3] Japanese Unexamined Patent Application Publication No. 8-96111
[PTL 4] Japanese Unexamined Patent Application Publication No. 2016-062225
[PTL 5] Japanese Unexamined Patent Application Publication No. 2011-209116

SUMMARY OF INVENTION

Technical Problem

When a hairstyle, clothing and the like are synthesized with a face image, there is a demand for synthesizing any one of the images with the other image without any breakdown or mismatch. In addition, there is a demand for maintaining face features of a person captured in the original face image as much as possible.

Patent Literature 1 is a technology for replacing a face part of a subject with a face image for synthesis. Since the original face image for synthesis is deformed and synthesized, the face features of the original image are not maintained in the generated synthetic image. Furthermore, since privacy protection and the like are a main purpose and it is not required to generate a high quality (natural) synthetic image, Patent Literature 1 does not disclose a technology for generating a high quality synthetic image.

Since the technology disclosed in Patent Literature 2 is a technology for synthesizing the background image not including the person with the image of the person, Patent Literature 2 does not disclose a technology for synthesizing a face image with clothing and the like without mismatch.

In the composition method disclosed in Patent Literature 3, manual edition is performed. Accordingly, it is also difficult to generate a high quality composite image immediately after a face image is input and to generate a large number of composite images in a short period of time. Furthermore, as a method for deforming face components and the like to be optimal for a face, Patent Literature 3 discloses only enlargement, reduction, movement, and rotation. Patent Literature 3 does not disclose a procedure when a device performs automatic composition.

The composition method disclosed in Patent Literature 4 is a technology for generating a face image when there is a change in illumination conditions and the like, and is not a technology for synthesizing a face part of the face image with the other parts.

One object of the present disclosure is to provide to a device, a method and the like capable of generating, from an input face image, an image in which parts other than a face are naturally synthesized without impairing the features of the face included in the face image. The aforementioned "naturally" means that there is less mismatch and it is not unnatural.

Solution to Problem

An image generation device according to one aspect of the present invention includes: image selection means for selecting a second face image from a plurality of face images stored in advance based on directions of faces included in the plurality of face images and a direction of a face included in an input first face image; image deformation means for deforming the second face image based on feature points of the face included in the first face image and feature points of a face included in the second face image such that a face region of the second face image matches a face region of the first face image; and image generation means for generating a third face image in which the face region of the first face image is synthesized with a region other than the face region of the deformed second face image.

A face matching device according to one aspect of the present invention includes: input means for receiving a face image as input; and matching means for collating a third face image with the face image received as the input, the third face image generated by synthesizing a face region of a first face image with a region other than a face region of a second face image deformed to match the face region of the first face image based on feature points of a face included in the first face image and feature points of a face included in the second face image, the second face image being selected from a plurality of face images stored in advance based on directions of faces included in the plurality of face images and a direction of the face included in the first face image.

An image generation method according to one aspect of the present invention includes: selecting a second face image from a plurality of face images stored in advance based on directions of faces included in the plurality of face images and a direction of a face included in an input first face image; deforming the second face image based on feature points of the face included in the first face image and feature points of a face included in the second face image such that a face region of the second face image matches a face region of the first face image; and generating a third face image in which the face region of the first face image is synthesized with a region other than the face region of the deformed second face image.

A computer readable storage medium according to one aspect of the present invention stores a program causing a computer to execute: image selection processing of selecting a second face image from a plurality of face images stored in advance based on directions of faces included in the plurality of face images and a direction of a face included in an input first face image; image deformation processing of deforming the second face image based on feature points of the face included in the first face image and feature points of a face included in the second face image such that a face region of the second face image matches a face region of the first face image; and image generation processing of generating a third face image in which the face region of the first face image is synthesized with a region other than the face region of the deformed second face image.

Advantageous Effects of Invention

According to the present disclosure, it is possible to generate, from an input face image, an image in which parts other than a face are naturally synthesized without impairing the features of the face included in the face image.

BRIEF DESCRIPTION OF DRAWINGS

FIG. 10 is a diagram illustrating an example in which a part other than a face region in a material image for synthesis is extracted from the material image for synthesis and a reverse mask.

EXAMPLE EMBODIMENT

Hereinafter, example embodiments are described in detail with reference to the drawings. It should be noted that elements described in the following example embodiments are merely examples and the technical scope of the present invention is not intended to be limited only thereto.

FIRST EXAMPLE EMBODIMENT

Firstly, a first example embodiment is described.

DESCRIPTION OF CONFIGURATION

Figure 1:
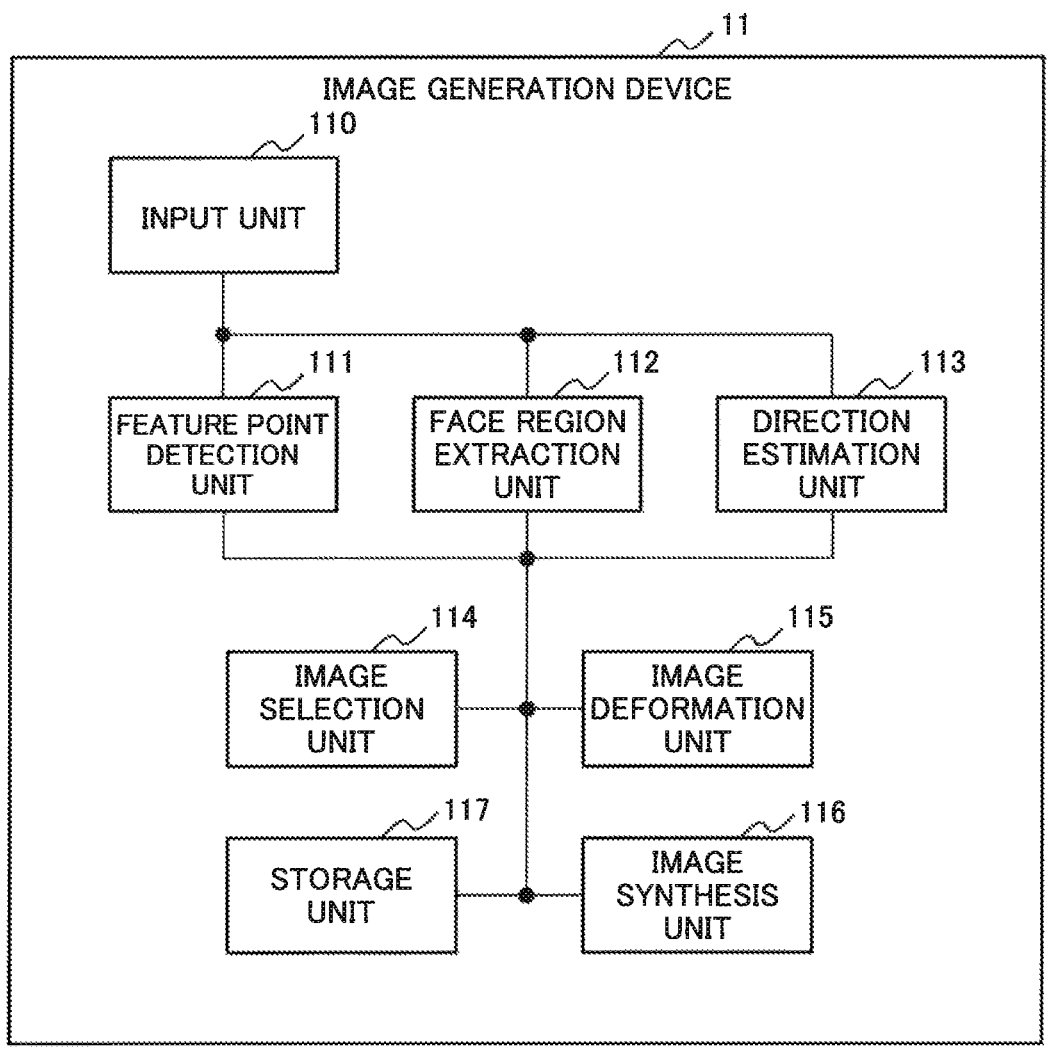
FIG. 1 is a block diagram illustrating a configuration of an image generation device according to a first example embodiment.
Figure 2:
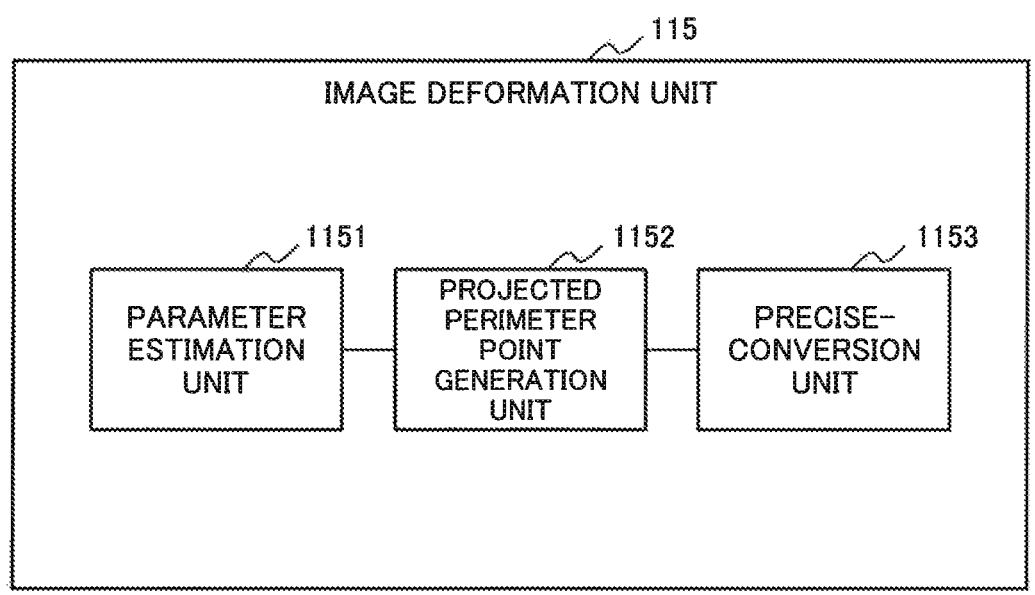
FIG. 2 is a block diagram illustrating a configuration of an image deformation unit according to a first example embodiment.

FIG. 1 illustrates a configuration of an image generation device 11 according to the first example embodiment. The image generation device 11 includes an input unit 110, a feature point detection unit 111, a face region extraction unit 112, a direction estimation unit 113, an image selection unit 114, an image deformation unit 115, an image synthesis unit 116, and a storage unit 117. The image deformation unit 115 includes a parameter estimation unit 1151, a projected perimeter point generation unit 1152, and a precise-conversion unit 1153 as illustrated in FIG. 2.

The input unit 110 receives an image of a person's face as input. That is, the input unit 110 captures the image of the person's face. Hereinafter, the image captured by the image generation device 11 by input is also called a "target face image". The target face image may be acquired through imaging by an imaging device such as a camera, or may be read from a storage medium, a storage device and the like that store the image of the person's face. The target face image may be appropriately subjected to correction such as trimming.

The feature point detection unit 111 detects the person's face captured in the target face image and feature points of the face. The feature points of the face are points representing the features of the person in the person's face (including an outline). As methods for detecting the face and the feature points of the face, there are a Viola-Jones method and the like for example. It should be noted that the Viola-Jones method is a merely example and the feature point detection unit 111 may detect the face and the feature points of the face by using other known methods.

When a plurality of persons have been captured in the target face image, the feature point detection unit 111 may also detect the feature points of faces of the respective persons or the feature points of a face of only a specific person. The specific person, for example, may be a person with the largest face size or a person with the brightest face. The specific person may be a person identified as a person of a face image designated in advance by matching with the face image designated in advance. Hereinafter, a person with a face from which face feature points have been extracted is referred to as a "target person".

The feature point detection unit 111 extracts feature points in at least the main parts of a face such as eyes, a nose, and a mouth. The feature points in the parts, for example, are end points (an eye inner corner, an eye tail and the like) of the parts, dividing points that divide a space between the end points on the parts into P (P is a natural number) equal parts, and the like. The feature point detection unit 111 may also detect feature points (for example, feature points in the outline, the eyebrow and the like of the face) positioned on the outside of the aforementioned main parts on the face.

The face region extraction unit 112 extracts a face region from the target face image. The face region of the target face image is a region in the target face image, which includes at least the feature points detected by the feature point detection unit 111. The face region of the target face image, for example, is a region inside of the face of the target person (which may include an outline), which includes the main parts of the face.

The face region extraction unit 112 extracts the face region on the basis of at least one of the feature points detected by the feature point detection unit 111. The face region extraction unit 112, for example, may extract a closed region, which is formed by interconnecting feature points positioned on the outside of the main parts of the face among the detected feature points, as the face region. A specific example of the extraction process of the face region is described in the following [description of operation]. In the following description, feature points based on which the face region is extracted are also referred to as "points defining the face region".

Furthermore, the face region extraction unit 112, for example, may generate a mask in which "1" is assigned to points inside the face region as a mask value and "0" is assigned to points of the other regions as a mask value. The face region extraction unit 112 may generate an image (hereinafter, a masked image) in which pixel values of pixels other than the face region become zero and pixel values of only an image of the face region remain by multiplying a mask value of each pixel of the target face image by a mask value of each pixel of the mask.

Information on the extracted feature points, for example, may be stored in the storage unit 117. Also, the information on the extracted feature points may be stored to be referred to by each element of the image generation device 11. The information on the feature points, for example, is information indicating the position of each feature point, and each part of the face to which each feature point corresponds.

The direction estimation unit 113 estimates an orientation of the face of the target person (also referred to as a "direction of the face"). The direction of the face, for example, indicates the direction in which the face of the person faces on a three-dimensional space of the face image. The direction of the face, for example, can be described by three types of angles (a pitch angle, a yaw angle, and a roll angle) based on the front direction of the face image, that is, the direction of the face when facing the front with respect to an imaging device. The pitch angle is a rotation angle around the right and left axes, the yaw angle is a rotation angle around the upper and lower axes, and the roll angle is a rotation angle around the front and rear axes. In other examples, the direction of the face can be described by three-dimensional vectors. For example, the direction estimation unit 113 may describe the normal direction of the face by using three reference vectors in directions perpendicular to each other, which include a reference vector parallel to the front direction of the face image. Hereinafter, information for specifying the direction of the face is referred to as direction information.

The direction estimation unit 113 may estimate the direction of the face by using the method disclosed in Patent Literature 5 (in the above), and the like. The method disclosed in the aforementioned Literature is a merely example and the direction estimation unit 113 may estimate the direction of the face of the person by using other known methods.

The storage unit 117 stores material images. The material images are face images including faces of persons. The material image serves as a material constituting parts other than a face part in a synthetic image generated by the image generation device 11. For example, a user of the image generation device 11 stores a face image of a person, who has a shape or a hairstyle used in synthesis or wears clothing used in the synthesis, in the storage unit 117 as the material image. In the material image to be stored, information on the feature points of a face included in the material image and direction information are stored in association with each other. The information on the feature points of the face and the direction information may be detected by the image generation device 11 and the like. One or more of the feature points of the face included in the material image correlate with the feature points detected in the target face image by the feature point detection unit 111. For example, all the feature points of the face included in the material image may be correlated with the feature points detected in the target face image, respectively. The feature points of the face included in the material image, for example, may be feature points detected by the same method as the detection method of the feature point detection unit 111.

The image selection unit 114 selects a material image appropriate for synthesis from the material images stored in the storage unit 117. The material image appropriate for synthesis is a material image in which the face of the target person is easily synthesized without mismatch.

The material image, in which the face of the target person is easily synthesized without mismatch, for example, is a material image of a face with an direction similar to that of the face of the target person. That is, the material image, in which the face of the target person is easily synthesized, is a material image in which direction information similar to the direction information of the target face image has been associated. The two pieces of direction information is "similar" to each other, for example, represents that values of parameters for describing the direction information are similar to each other between the two pieces of direction information.

That is, the image selection unit 114 selects the material image appropriate for synthesis on the basis of directions of faces included in a plurality of material images and the direction of the face of the target person. For example, when the direction information is described with the values of the pitch angle, the yaw angle, and the roll angle of the face, the image selection unit 114 may calculate an Euclidean distance between the direction information of the target person and direction information associated with each material image with respect to sets of the aforementioned three values. The Euclidean distance is a square root of the sum of squared values of differences between the values of parameters. Furthermore, the image selection unit 114 may select a material image, in which direction information with a small Euclidean distance has been associated with the direction information of the face of the target person, as a material image of a face with a direction similar to that of the face of the target person. For example, when direction information is represented by three-dimensional vectors, the image selection unit 114 may calculate an inner product between a unit vector representing the direction of the target person and a unit vector representing a direction associated with each material image. Furthermore, the image selection unit 114 may select a material image, with which a vector with a large inner product with a vector representing the direction of the face of the target person has been associated, as the material image of the face with the direction similar to that of the face of the target person.

The material image stored in the storage unit 117 may be associated with direction information in advance and stored.

The image selection unit 114 may select only one material image with which direction information most similar to that of the face of the target person has been associated. The image selection unit 114 may specify N (N is an integer equal to or more than 2) face images in which the similarity of direction information with respect to the direction information of the face of the target person is within a predetermined reference, and select M (M is an integer equal to or more than 1 and equal to or less than N) face images of the extracted face images in a random manner or on the basis of a specific reference. On the basis of the color, brightness and the like of a skin, the image selection unit 114 may decide a material image via a process of narrowing down appropriate material images. For example, the image selection unit 114 may compare the distribution of brightness within the face region of the target face image with the distribution of brightness within the face region of the material image. The image selection unit 114 may select a material image in which the distribution of the brightness within the face region is similar to that of the target face image. Therefore, it is expected that a more natural synthetic image is generated.

When two or more material images are selected by the image selection unit 114, a synthetic image generation process to be described below may be performed on each of the selected material images.

The image deformation unit 115 deforms the material image selected by the image selection unit 114 on the basis of information on the feature points of the material image, the target face image, and information on the feature points of the target face image. Hereinafter, an image, which is generated by this deformation, is referred to as a material image for synthesis. The material image for synthesis is an image for synthesizing the selected material image and the target face image with each other.

The image deformation unit 115 deforms the material image selected by the image selection unit 114 to be an image appropriate for synthesis. For the deformation to the image appropriate for synthesis, the image deformation unit 115 deforms the material image in the following procedure. The parameter estimation unit 1151, the projected perimeter point generation unit 1152, and the precise-conversion unit 1153 are elements included in the image deformation unit 115.

Firstly, on the basis of information on the feature points of the face of the target person and information on the feature points of the face of the selected material image, the parameter estimation unit 1151 estimates geometric transformation parameters that correlate a coordinate system of the target face image and a coordinate system of the material image with each other. The geometrical deformation performed herein needs not to be strict. For example, the parameter estimation unit 1151 may obtain geometric transformation parameters with the same degree of freedom as affine transformation. The parameter estimation unit 1151, for example, obtains geometric transformation parameters such that positions at which the feature points of the face of the target person are projected by the geometric transformation parameters are respectively close to positions of the correlated feature points of the material image as much as possible. In order to obtain such geometric transformation parameters, the parameter estimation unit 1151, for example, may use a least-squares method and the like.

The feature points of the face of the target person and the feature points of the face of the material image based on when obtaining the geometric transformation parameters may be all or some (for example, only feature points in main parts, and the like) of the feature points in the face.

The parameter estimation unit 1151 may estimate geometric transformation parameters with the degree of freedom higher than that of the affine transformation, but it is desired that the features of the face of the target person are not impaired due to conversion by the estimated parameters.

The projected perimeter point generation unit 1152 projects points on the perimeter of the target face image onto the material image by using the geometric transformation parameters estimated by the parameter estimation unit 1151. That is, the projected perimeter point generation unit 1152 specifies points on the material image, which correspond to the points on the perimeter of the target face image. In the present example embodiment, the points on the material image specified by the projection process are called projected perimeter points. The points on the perimeter of the target face image (hereinafter, "perimeter points"), which are projected onto the material image, for example, are a plurality of points including four apexes of a rectangle when the target face image is the rectangle.

The specified projected perimeter points on the material image may be positioned on the outside of the material image. Such a case, for example, is when the position of the face of the target person is significantly different from that of the face captured in the material image. Furthermore, even when the size of the face included in the material image is larger than that of the face of the target person, since the estimated geometric transformation parameters are parameters of deformation including deformation for enlarging an image, the projected perimeter points may be positioned on the outside of the material image. In such a case, the projected perimeter point generation unit 1152 may trim the target face image. For example, the projected perimeter point generation unit 1152 may trim the target face image such that the perimeter points of the target face image after being trimmed are projected onto the material image (also on the perimeter line). When the target face image has been trimmed, the image deformation unit 115 may perform the processes of the parameter estimation unit 1151 and the projected perimeter point generation unit 1152 again, and use the trimmed target face image, instead of the original target face image, in subsequent processes.

According to the projection of the projected perimeter point generation unit 1152 described above, it is possible to specify a region on the material image, which corresponds to an entire region of the target face image. That is, a line formed by interconnecting the projected perimeter points corresponds to a perimeter line (that is, an outline or a frame of an image) of the target face image.

After the projected perimeter points are specified, the precise-conversion unit 1153 converts the region of the material image, which corresponds to the entire region of the target face image, such that the face region of the material image matches the face region of the target face image.

The face region of the material image is a region in the material image corresponding to the face region of the target face image. That is, the face region of the material image is a region that is extracted on the basis of the feature points in the material image, which are correlated with the feature points (the feature points based on which the face region is extracted) defining the face region of the target face image. For example, when the face region of the target face image is extracted by interconnecting the feature points positioned on the outside of the main parts, the face region of the material image is a region formed by interconnecting feature points on the material image, which are respectively correlated with the feature points. That is, in such a case, the positions of the feature points in the material image after being deformed, which are correlated with the feature points defining the face region of the target face image, respectively coincide with the positions of the feature points defining the face region of the target face image by the conversion by the precise-conversion unit 1153.

In the present example embodiment, a region to be subjected to the conversion of the precise-conversion unit 1153 is the region of the material image corresponding to the entire region of the target face image. That is, the precise-conversion unit 1153, for example, cuts out a region surrounded by the line formed by interconnecting the projected perimeter points in the material image on the basis of the projected perimeter points, and converts the cut-out region. A perimeter line of the cut-out region corresponds to the perimeter line of the target face image on the material image.

The precise-conversion unit 1153, for example, converts the cut-out region such that a region surrounded by the perimeter line of the face region of the material image and the perimeter line of the cut-out region coincides with a region surrounded by the perimeter line of the face region of the target face image and the perimeter line of the target face image.

The conversion of the precise-conversion unit 1153 may be conversion such that not only the positions of the feature points in the material image correlated with the feature points defining the face region of the target face image but also the positions of feature points in the material image correlated with feature points, other than the feature points defining the face region of the target face image, respectively coincide with the positions of the feature points in the target face image correlated with the feature points. The conversion of the precise-conversion unit 1153 may be conversion based on feature points existing in the face region of the material image or may be conversion not based on the feature points. An image within the face region of the material image may not be subjected to the conversion of the precise-conversion unit 1153. This is because the image within the face region of the material image is replaced with the face of the target face image by a synthesis process of the image synthesis unit 116 to be described later.

For the aforementioned conversion, the precise-conversion unit 1153, for example, performs nonlinear geometrical deformation with a high degree of freedom. For example, the precise-conversion unit 1153 uses a method for performing the affine transformation for each patch of a triangle formed by interconnecting feature points and perimeter points, a thin plate spline method, and the like.

The precise-conversion unit 1153 may not always perform the nonlinear geometrical deformation on an entire region to be deformed. A region to be subjected to the nonlinear geometrical deformation may be a region including at least the perimeter line of a face region (which may be included as a boundary line). The precise-conversion unit 1153 may perform linear geometrical deformation on a partial region not including the perimeter line of the face region.

By the process of the image deformation unit 115 described above, the material image for synthesis is generated.

The image synthesis unit 116 generates a synthetic image. Specifically, the image synthesis unit 116 generates an image in which a part other than the face region extracted by the face region extraction unit 112 has been replaced with the material image for synthesis generated by the image deformation unit 115.

At the time of the generation of the synthetic image by the image synthesis unit 116, when the face region extraction unit 112 generates the mask, the image synthesis unit 116 may use the mask. That is, the image synthesis unit 116 reverses the mask values set in each pixel of the mask (assigns "1" to the part of "0" and "0" to the part of "1"), thereby generating a reverse mask capable of extracting only a part other than the face region. Then, the image synthesis unit 116 can extract the part other than the face region in the material image for synthesis by multiplying each pixel of the reverse mask and the material image for synthesis. The image synthesis unit 116 may synthesize the part other than the face region of the material image for synthesis extracted as above with the face region of the target face image (that is, the masked image generated by the face region extraction unit 112). As described above, since the material image for synthesis is deformed such that its face region coincides with the face region of the target face image, the masked image of the target face image and the image other than the face region of the material image for synthesis can be synthesized with each other only by simply adding each pixel.

However, in such synthesis, an unnatural edge may appear on the boundary between the two synthetic images. The image synthesis unit 116 may adjust the hue, saturation, and lightness of one or both of the two images to be added or process the colors of pixels in the vicinity of the boundary. For the vicinity of the boundary, for example, the image synthesis unit 116 may average and mix weighted mask values of the two images to be added. The image synthesis unit 116 may use a technique such as Poisson Image Editing.

DESCRIPTION OF OPERATION

Figure 3:
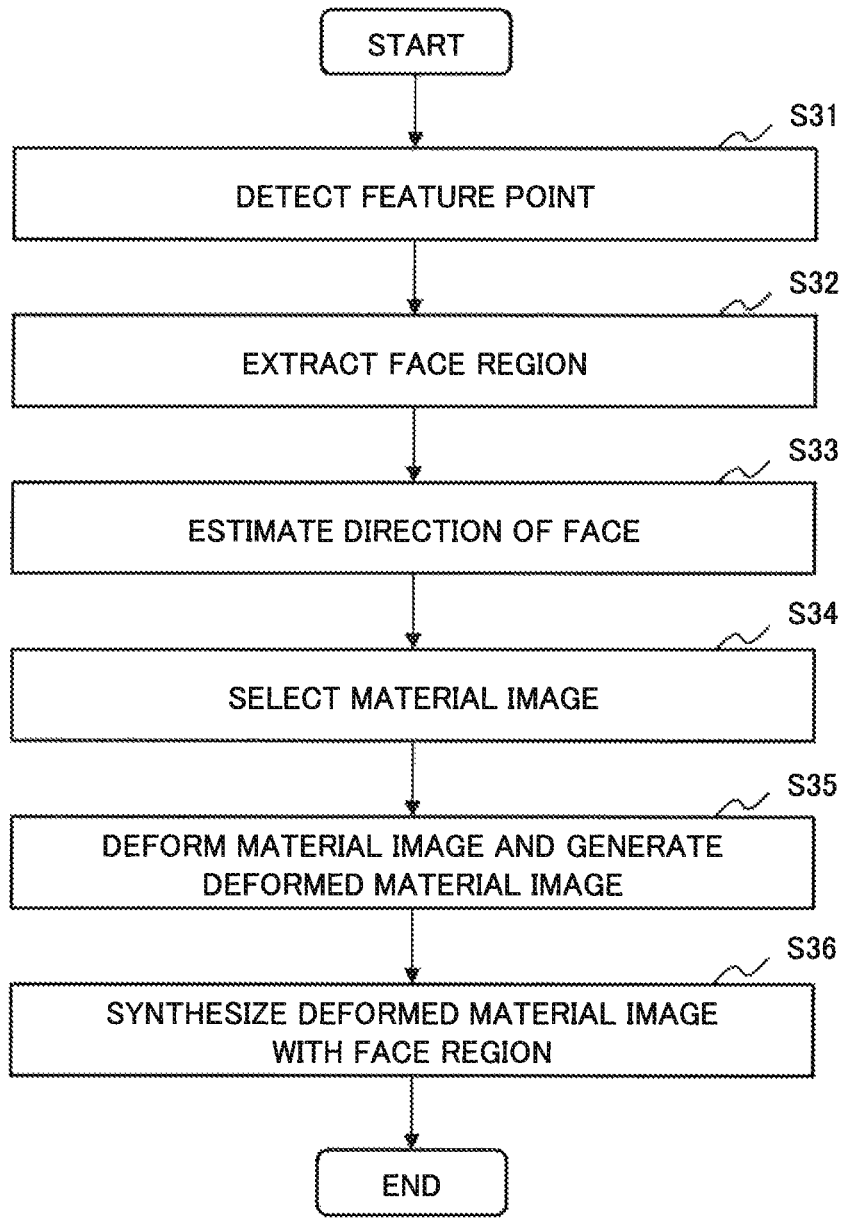
FIG. 3 is a flowchart illustrating the flow of an operation of an image generation device according to a first example embodiment.

Next, an example of the operation of the image generation device 11 according to the first example embodiment is described using specific examples. FIG. 3 is a flowchart illustrating the flow of the processing of the image generation device 11. However, since the flow of the processing illustrated in FIG. 3 is an example, each step may not be always performed in the order illustrated in FIG. 3.

Figure 4:
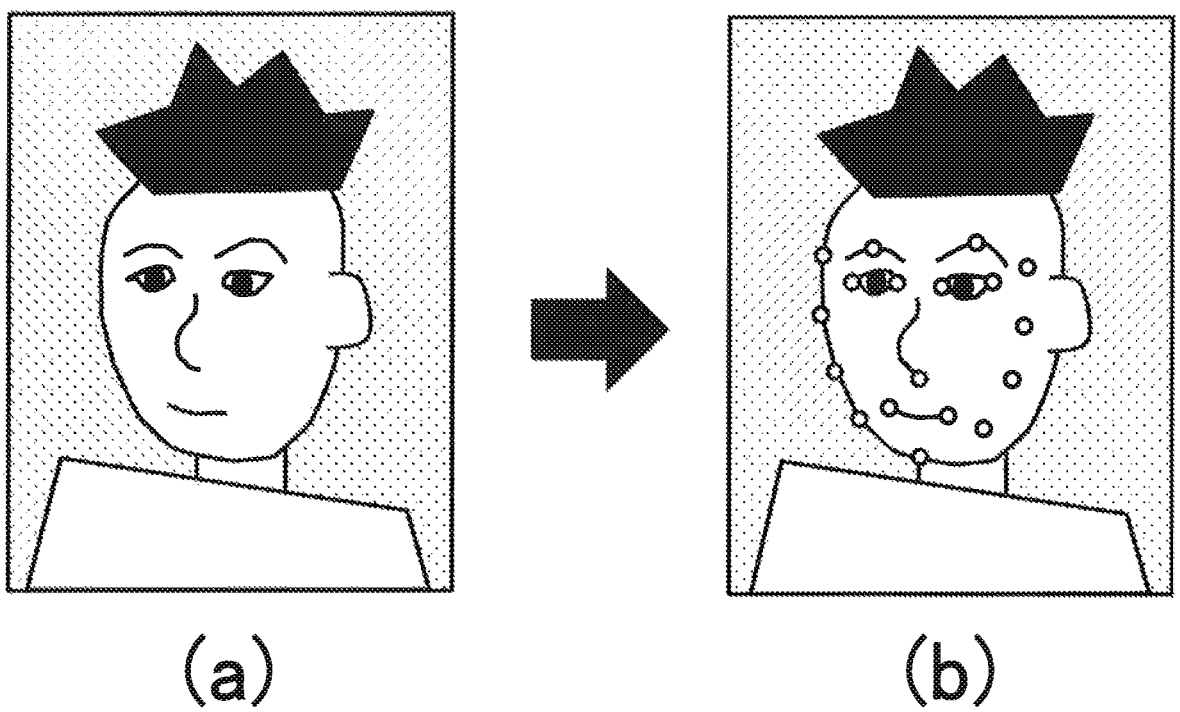
FIG. 4 is a diagram illustrating an example of feature points extracted in a target face image.

In step S31, the feature point detection unit 111 detects a face and face feature points in a target face image captured by the input unit 110. (a) of FIG. 4 is an example of the target face image. In this example, it is assumed that the feature point detection unit 111, for example, detects the total 18 feature points in parts indicated by small white circles in (b) of FIG. 4, that is, both eye tails, both eye inner corners, under the nose, outer corners of a mouth, eyebrows, an outline (a face line) and the like.

Figure 5:
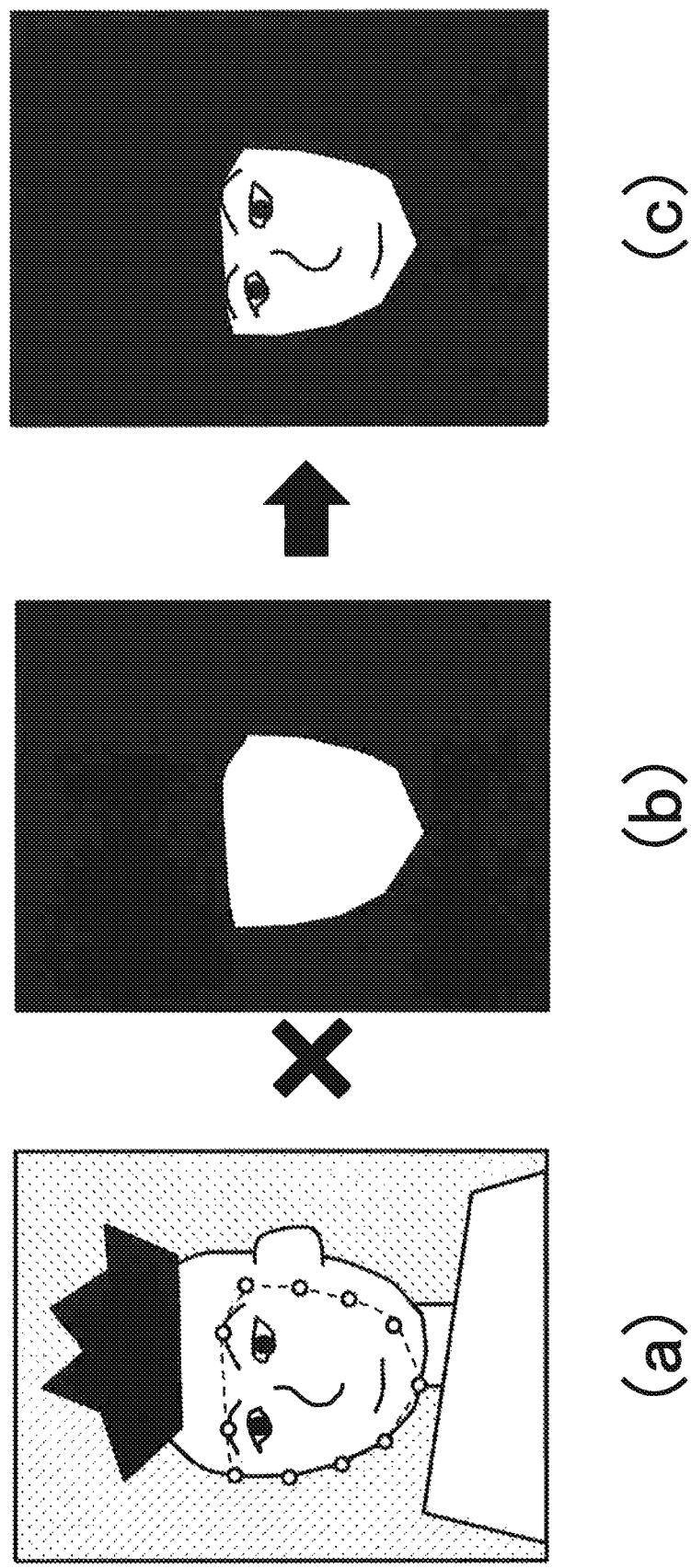
FIG. 5 is a diagram illustrating an example of a target face image in which a face region is specified, a mask, and a masked image generated by multiplication thereof.

In step S32, the face region extraction unit 112 extracts a face region of the input image on the basis of the face feature points detected in step S31. For example, the face region extraction unit 112 extracts a closed region, which is formed by interconnecting feature points on the outline of the face and feature points of the eyebrow among the feature points detected in step S31 by using line segments so as to surround the eyes, the nose, and the mouth, as a face region ((a) of FIG. 5).

The face region extraction unit 112 may extract the face region by any methods other than the aforementioned method so long as they are methods capable of extracting a region including the main parts of the face on the basis of the feature points. For example, the face region extraction unit 112 may employ a region, which is surrounded by a smooth curve (for example, an interpolation type spline curve) that uses end points at positions where line segments are extended by a predetermined length as control points, as the face region, the line segments interconnecting the feature points on the nose and the feature points on the edges of the eyes and the mouth.

Then, the face region extraction unit 112 generates a mask for extracting only a face region of a target person. For example, the face region extraction unit 112 generates a binary mask in which "1" is assigned to points inside the face region and "0" is assigned to the other regions as mask values in the target face image ((b) of FIG. 5).

Then, the face region extraction unit 112 generates a masked image by using the mask. For example, the face region extraction unit 112 generates the masked image in which only pixels of the face region have been extracted by multiplying each pixel of the target face image and each pixel of the mask ((c) of FIG. 5).

In step S33, the direction estimation unit 113 estimates the direction of the face of the target person. For example, it is assumed that the direction estimation unit 113 estimates the direction of the face by using the method disclosed in Patent Literature 5, and the like. On the basis of the estimated direction, the direction estimation unit 113 generates direction information.

In step S34, the image selection unit 114 selects a material image appropriate for synthesis from the material images stored in the storage unit 117. In a specific example, it is assumed that the image selection unit 114 selects one material image in which an Euclidean distance between the direction information of the target face image and direction information associated with the material image, that is, the sum of squared values of deviations among various angle values for deciding the direction of the face is the smallest.

It is assumed that feature points in the selected material image, which are correlated with the feature points of the target face image, can be respectively specified. In order to be able to perform the subsequent processes, at least the feature points of the material image correlated with feature points defining the face region of the target face image may be respectively specified.

In step S35, the image deformation unit 115 deforms the material image selected in step S34 to be an image appropriate for synthesis. In a specific example, each element of the image deformation unit 115 performs the following processing.

Figure 6:
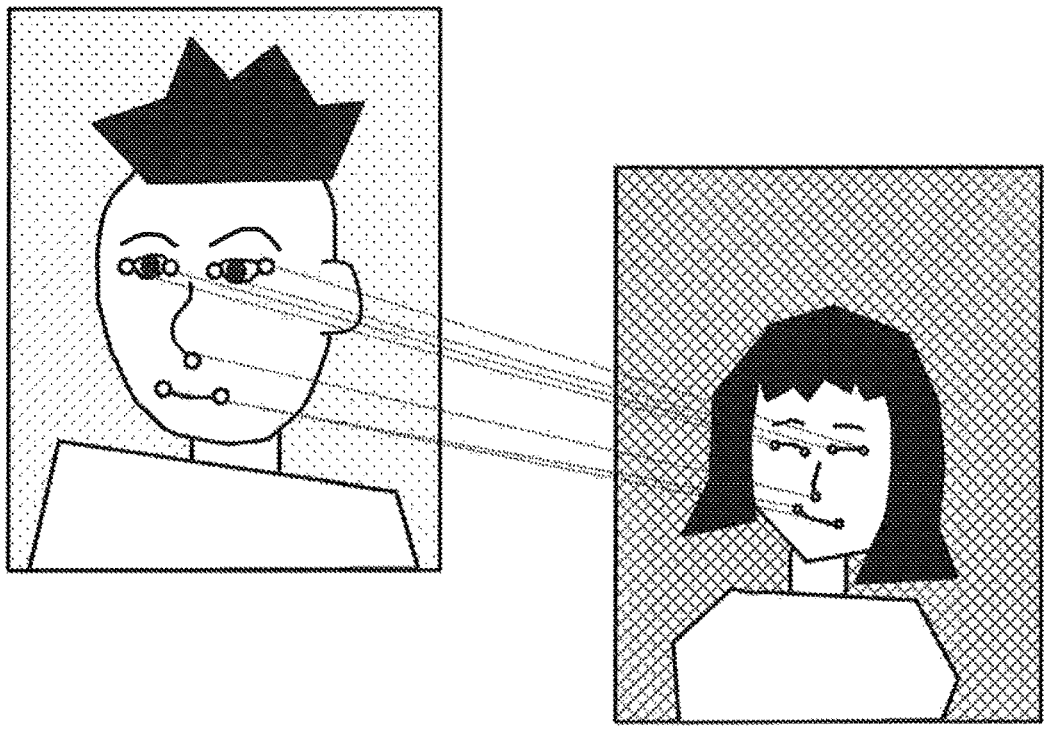
FIG. 6 is a diagram illustrating the concept of a process for specifying each correspondence between feature points in a target face image and feature points in a material image.

Firstly, on the basis of information on the feature points of the face of the target face image and information on the feature points of the face of the material image, the parameter estimation unit 1151 estimates geometric transformation parameters that correlate a coordinate system of the target face image and a coordinate system of the material image with each other. For example, the parameter estimation unit 1151 estimates affine transformation parameters by using the least squares method by comparing the positions of the feature points on the eyes, the nose, and the mouth of the face of the target face image with the positions of the feature points of the material image, which are correlated with the feature points (FIG. 6).

Figure 7:
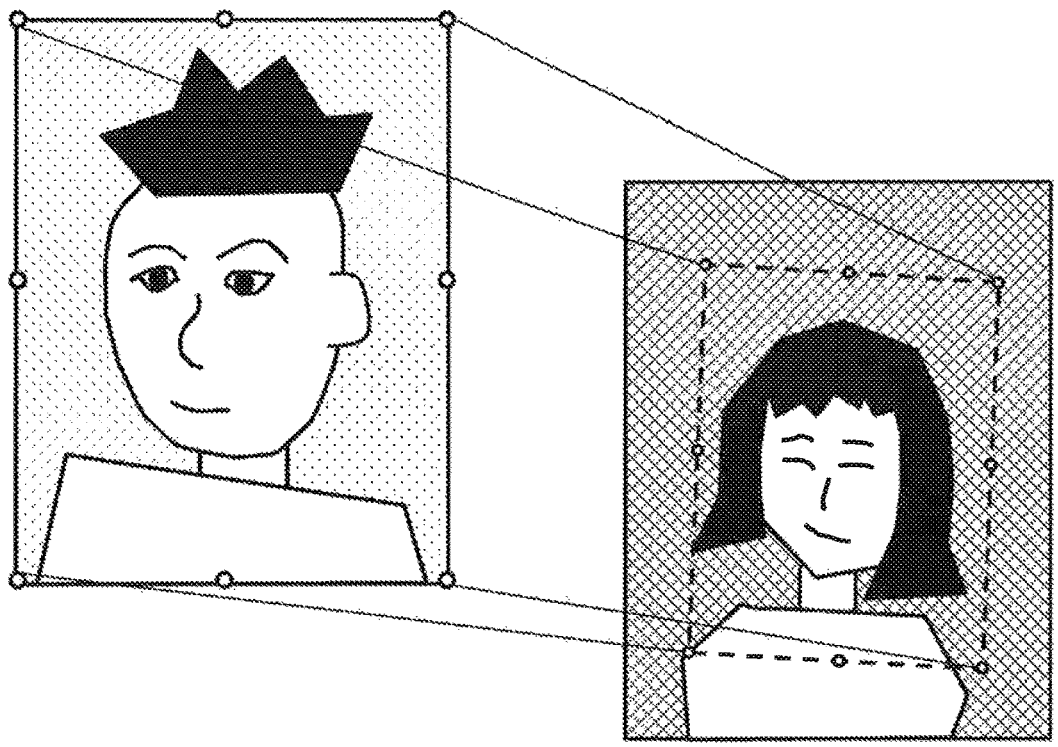
FIG. 7 is a diagram illustrating the concept of a process for specifying perimeter points of a target face image and projected perimeter points corresponding to the perimeter points.

Then, the projected perimeter point generation unit 1152 projects points (eight points in an example of FIG. 7) on the perimeter of the target face image onto the material image by using the estimated affine transformation parameters. The points specified on the material image by the projection are defined as projected perimeter points.

Then, the precise-conversion unit 1153 converts a region of the material image corresponding to an entire region of the target face image such that the face region of the material image matches the face region of the target face image. The region of the material image corresponding to the entire region of the target face image is a line formed by interconnecting the projected perimeter points. The precise-conversion unit 1153, for example, cuts out the region by the line formed by interconnecting the projected perimeter points. Then, the precise-conversion unit 1153 converts the cut-out region by using the thin plate spline method such that the shape of a region (a region indicated by an oblique line in (a) of FIG. 8) surrounded by the perimeter line of the face region and the perimeter line of the cut-out region becomes the shape of a region (a region indicated by an oblique line in (b) of FIG. 8) surrounded by the perimeter line of the face region of the target face image and the perimeter line of the target face image. In such a case, the precise-conversion unit 1153 may refer to the transformation parameters estimated by the parameter estimation unit 1151. For example, the precise-conversion unit 1153 may convert the region of the material image corresponding to the entire region of the target face image by using inverse transformation parameters of the transformation parameters estimated by the parameter estimation unit 1151, and then may perform precise-conversion.

Figure 8:
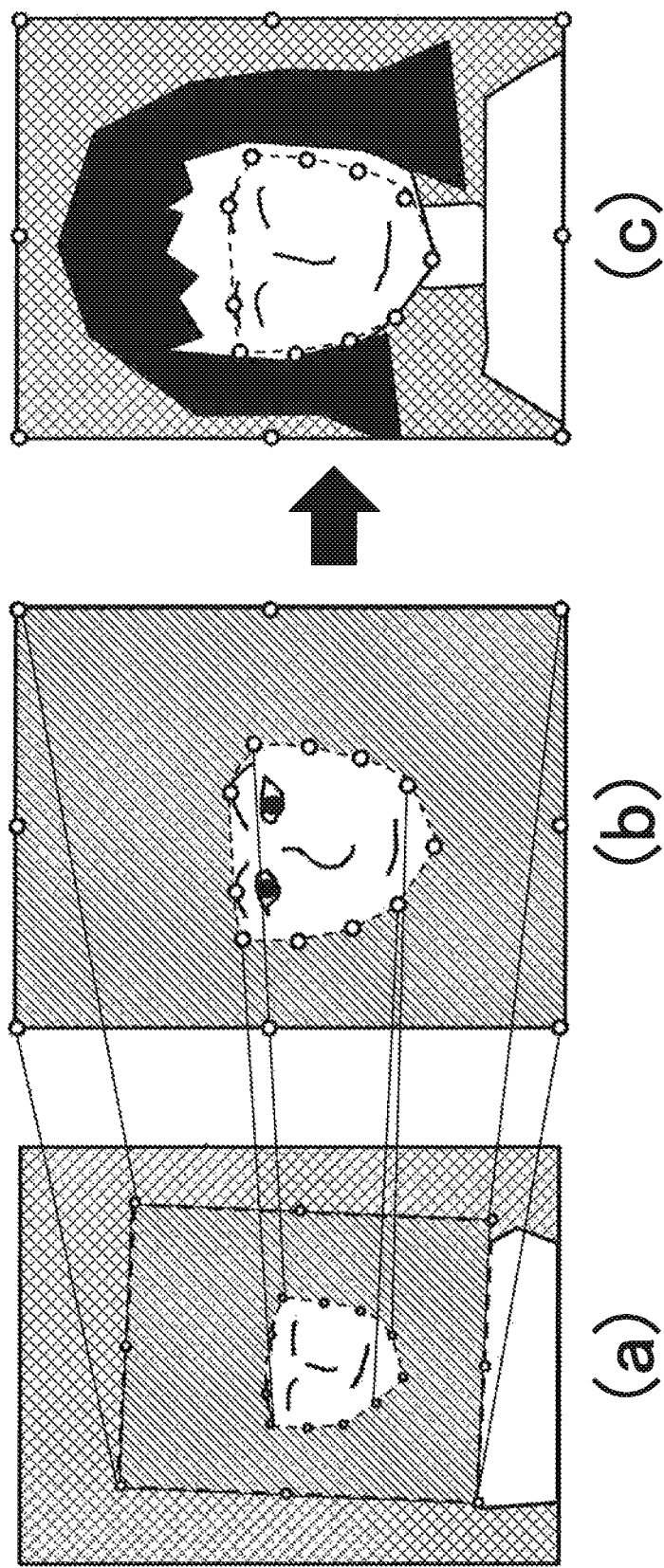
FIG. 8 is a diagram illustrating the concept of a process for generating a material image for synthesis by deforming a material image.

By these processes, the image deformation unit 115 generates a material image for synthesis ((c) of FIG. 8) in which the face region coincides with the face region of the target face image.

Figure 9:
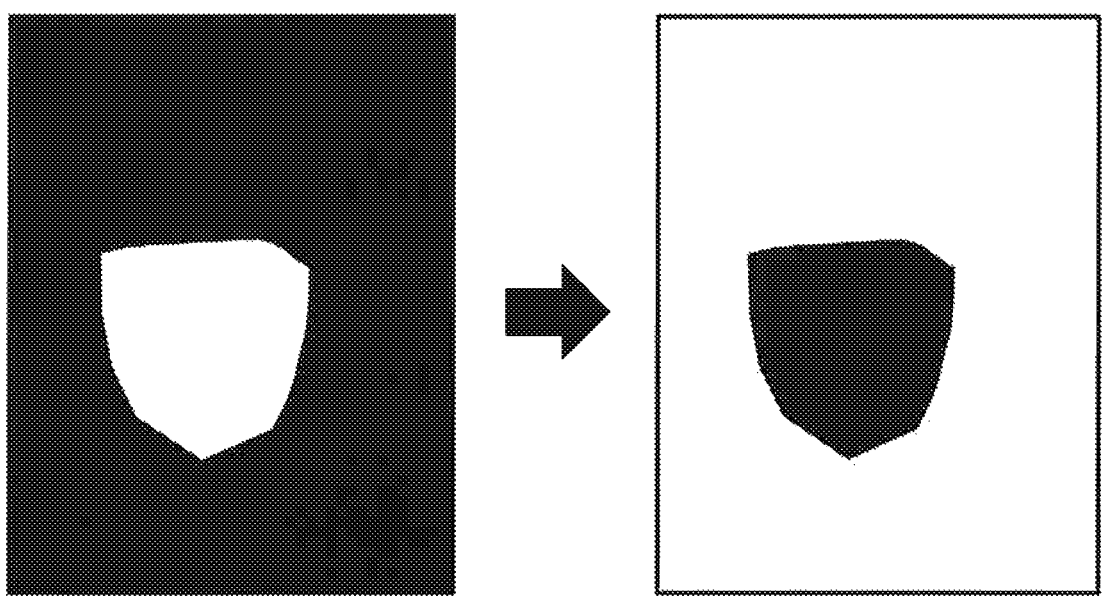
FIG. 9 is a diagram illustrating the concept of a process for generating a reverse mask.
Figure 11:
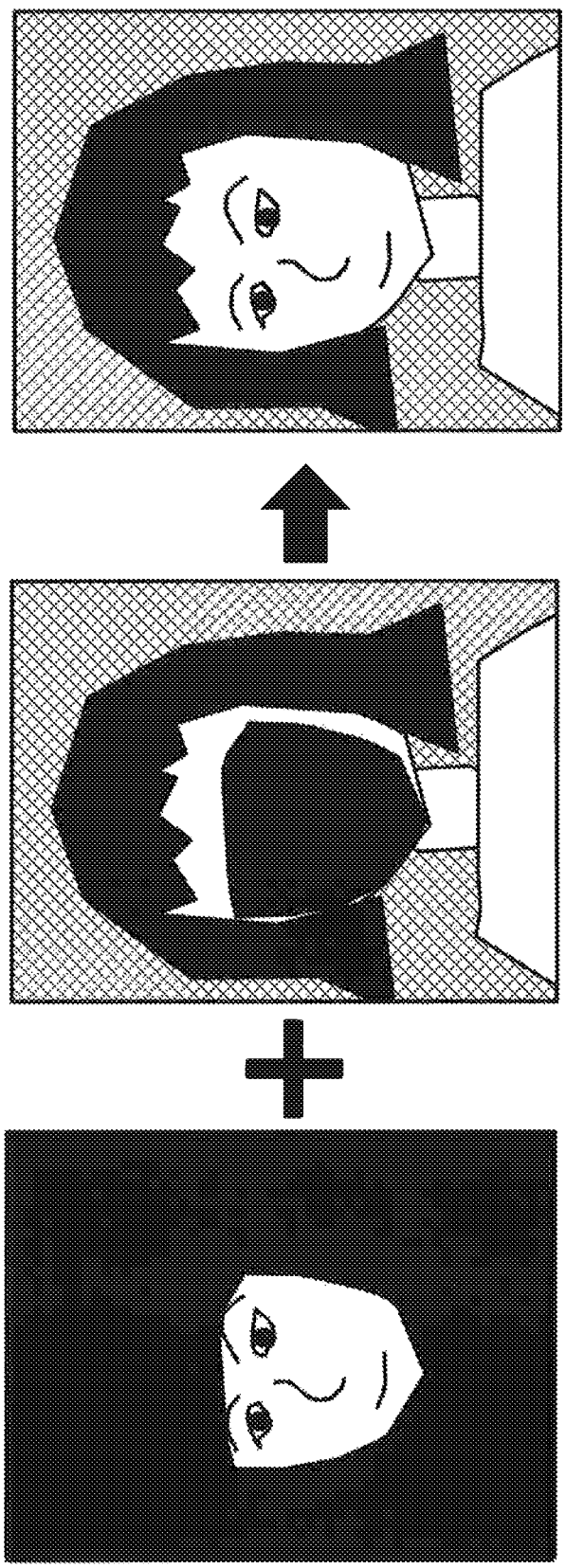
FIG. 11 is a diagram illustrating the concept of generating a synthetic image by synthesizing a masked image with a part other than a face region in a material image for synthesis.

In step S36, the image synthesis unit 116 newly generates a synthetic image by synthesizing the masked image generated in step S32 with the material image for synthesis generated in step S35. The image synthesis unit 116 firstly reverse the mask value of the mask generated in step S32 (assigns 1 to the part of 0 and 0 to the part of 1), thereby generating a reverse mask for extracting a region other than the face (FIG. 9). Next, the image synthesis unit 116 multiplies the material image for synthesis generated in step S35 by the aforementioned reverse mask, thereby extracting a region other than the face of the material image for synthesis (FIG. 10). Then, the image synthesis unit 116 synthesizes the extracted region other than the face of the material image for synthesis with the masked image generated in step S32 by using a method such as Poisson Image Editing (FIG. 11).

By the above processing flow, a synthetic image, which can be seen as if the target person has the appearance or hairstyle of the material image or wears a decorative object, is generated.

Effects

In accordance with the image generation device 11 according to the first example embodiment, a face periphery can be replaced with another texture while retaining the features of the face of the target person captured in the target face image.

The image generation device 11 does not deform the extracted face region of the target face image. Therefore, the features of the target person can be retained. On the other hand, since the material image is precisely deformed by the image deformation unit 115 according to the target face image, an image generated by the synthesis becomes a natural image (without mismatch). The image selection unit 114 selects a material image associated with direction information similar to that of the face included in the target face image, thereby generating a synthetic image without any mismatch.

As described above, the generated synthetic image is an image synthesized such that there is no mismatch and face features are not impaired. Consequently, the generated synthetic image, for example, is an image with high reliability as teaching data to be used in face recognition or face authentication.

A plurality of material images are stored in the storage unit 117, so that the image generation device 11 can automatically perform all processes from the selection to the deformation and synthesis of the material image. That is, in accordance with the image generation device 11, it is possible to quickly generate various synthetic images with less labor.

By generating a variety of synthetic images, for example, a device that performs face matching using these synthetic images as teaching data can perform more precise matching.

Furthermore, by immediately generating an image in which various textures are naturally synthesized in a person captured in an input face image, for example, it is possible to easily consider a hairstyle or a shape similar to the person in consideration of the features of the person.

MODIFICATION EXAMPLE

The material image may not always include a face of a specific person. That is, a face may not be captured in a face part of the material image (a part to be replaced to the face of the target face image). Instead, when information indicating the positions of main parts of a face is associated with the material image, each process of the image generation device 11 can be performed.

MODIFICATION EXAMPLE 2

Furthermore, for example, when similarity between direction information of the target person and direction information associated with the material image is computed, the image selection unit 124 may not consider a rotation angle (that is, a roll angle) on a plane parallel to an image. That is, the image selection unit 124 may compute the similarity of the two pieces of direction information on the basis of only a yaw angle and a pitch angle.

When the geometric transformation parameters estimated by the parameter estimation unit 1151 are transformation parameters including a rotation operation like the affine transformation parameters, a deviation related to the roll angle between the selected material image and the target face image have no influence on the quality of the synthetic image. This is because such a deviation is considered in correlation between the coordinate system of the material image and the coordinate system of the target face image.

When the geometric transformation parameters estimated by the parameter estimation unit 1151 do not consider rotation, the image generation device 11 may use an image obtained by rotating the material image as a new material image. For example, the image selection unit 124 rotates the selected material image on the basis of a deviation (a difference) of both the roll angles of the material image and the target face image, thereby allowing the roll angles to coincide with each other. Then, the image selection unit 124 transmits the image newly generated by the rotation to the image deformation unit 115 as a material image. In this way, this new material image is used in the process subsequent to step S35. When the material image is rotated, the image selection unit 124 also corrects the information on the feature points in the target face image. That is, the image selection unit 124 also rotates the coordinates of the feature points by using rotation parameters used in the rotation of the target face image, thereby updating position information of the feature points.

In accordance with such a modification example, a material image including a face with a roll angle different from that of the face of the target person may also be a candidate of material images that can be synthesized. That is, the number of selectable material images is not limited by the similarity of the roll angle. Consequently, more material images can be used as material images having a direction similar to that of the target person.

MODIFICATION EXAMPLE 3

In the aforementioned example embodiment, the image synthesis unit 116 generates an image in which a part other than the face region extracted by the face region extraction unit 112 has been replaced with the material image for synthesis generated by the image deformation unit 115. As a modification example, the image synthesis unit 116 may generate an image in which the face region in the material image has been replaced with the face region of the target face image. That is, a range of the entire material image may be used in synthesis. Such a case is described as a modification example 3 below.

In the modification example 3, the process of the precise-conversion unit 1153 in step S35 and the process of the image synthesis unit 116 in step S36 are different from the processes already described. Details are as follows.

The precise-conversion unit 1153 specifies respective positions when the face region of the target face image is projected on the material image onto the basis of the geometric transformation parameters estimated by the parameter estimation unit 1151. In such a case, it is assumed that the geometric transformation parameters estimated by the parameter estimation unit 1151 are parameters that are not distorted (that is, restorable only by linear geometric transformation) as with affine transformation. Then, the precise-conversion unit 1153 converts feature points in the material image, which are correlated with the feature points defining the face region of the target face image, so as to match the face region in which the aforementioned position has been specified. That is, the precise-conversion unit 1153 converts a part or the whole of the material image such that the face region of the target face image can be naturally synthesized while maintaining its features.

Figure 12:
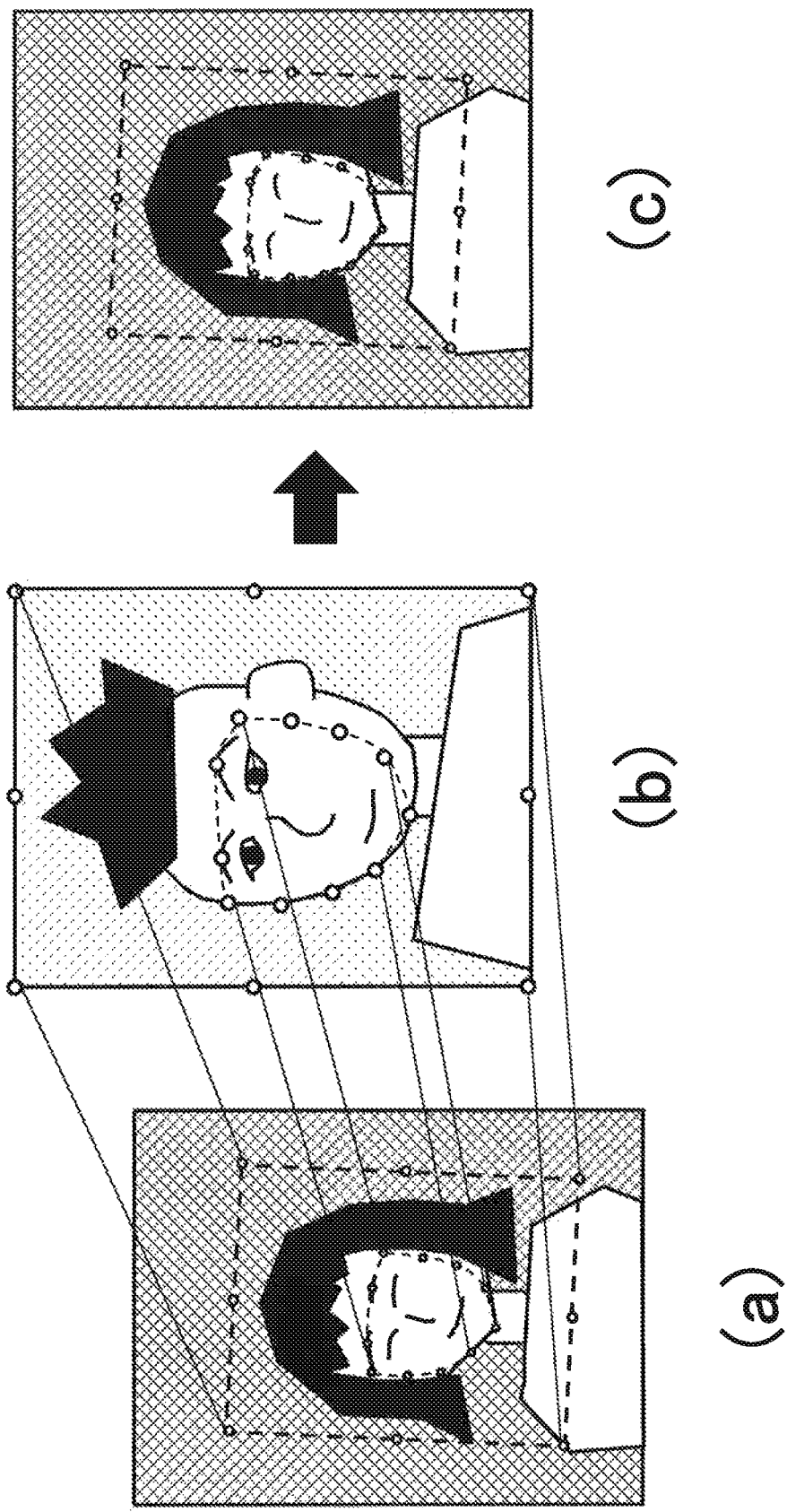
FIG. 12 is a diagram illustrating the concept of material image deformation performed by a precise-conversion unit according to a modification example 3 of a first example embodiment.

For example, the precise-conversion unit 1153 converts the material image such that the shape of the face region of the material image becomes the shape of a region formed when the face region of the target face image is projected onto the material image by the geometric transformation parameters estimated by the parameter estimation unit 1151 (FIG. 12). In the example of FIG. 12, an image of (a) of FIG. 12 is the material image before being converted and an image of (c) of FIG. 12 is the material image after being converted. The shape of the face region of the material image before being converted is a shape that is not synthesizable unless the face region of the target face image ((b) of FIG. 12) is nonlinearly converted. On the other hand, the shape of the face region of the material image after being converted is a shape that is synthesizable only through linear geometric transformation of the face region of the target face image.

A region to be converted by the precise-conversion unit 1153 may be the whole of the material image or may be a region including all the feature points of at least a face. For example, the region to be converted by the precise-conversion unit 1153 may be a region surrounded by the projected perimeter points in the material image, that is, a region corresponding to the region of the entire target face image.

The image generated through such conversion is assumed to be a material image for synthesis. In this way, the face region of the target face image can be naturally fitted to the material image for synthesis only through the conversion by the geometric transformation parameters. That is, the face region of the target face image can be fitted to the material image for synthesis without nonlinear conversion.

Figure 13:
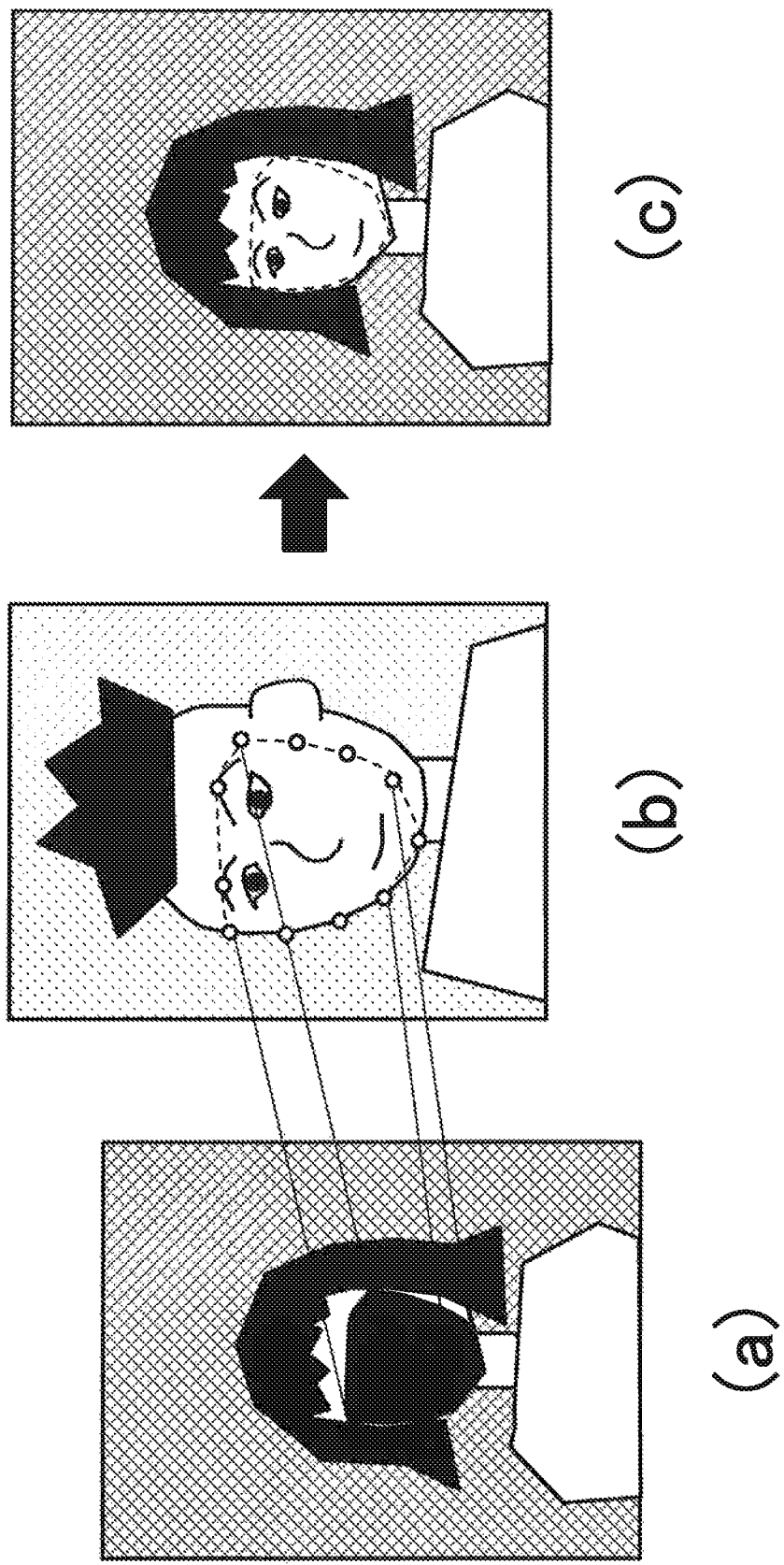
FIG. 13 is a diagram illustrating the concept of synthesis performed by an image synthesis unit according to a modification example 3 of a first example embodiment.

In step S36, the image synthesis unit 116 synthesizes a part ((a) of FIG. 13) other than the face region in the material image for synthesis with the face region ((b) of FIG. 13) of the target face image. In such a case, the image synthesis unit 116 geometrically deforms the target face image on the basis of the geometric transformation parameters estimated by the parameter estimation unit 1151, and synthesizes the deformed target face image with the material image for synthesis. Since the face region of the material image for synthesis is deformed such that the face region of the geometrically deformed target face image is fitted, the synthesis can be easily performed. By such synthesis, a synthetic image, in which the face of the target person has been naturally synthesized with the material image, is generated ((c) of FIG. 13).

According to the processing as above, it is possible to generate the synthetic image using the whole of the selected material image. In this synthetic image, since the face of the target person is subjected to only geometric transformation such as affine transformation, features of an individual are less impaired as compared with a case where nonlinear transformation is performed. Particularly, when the geometric transformation of the face of the target person is transformation by a combination of enlargement or reduction, in which there is no change in an aspect ratio, and rotation, the features of the individual are not impaired.

According to another modification example of the aforementioned modification example 3, in step S35, the precise-conversion unit 1153 may geometrically convert the entire material image on the basis of the geometric transformation parameters estimated by the parameter estimation unit 1151. When the precise-conversion unit converts a material image based on the geometrically converted material image and generates a material image for synthesis, even though the face region of the target face image is not geometrically converted, the image synthesis unit 116 can synthesize the material image for synthesis with the face region. That is, in such a case, it is possible to generate a synthetic image using the whole of the material image without any conversion of the face of the target person.

SECOND EXAMPLE EMBODIMENT

Figure 14:
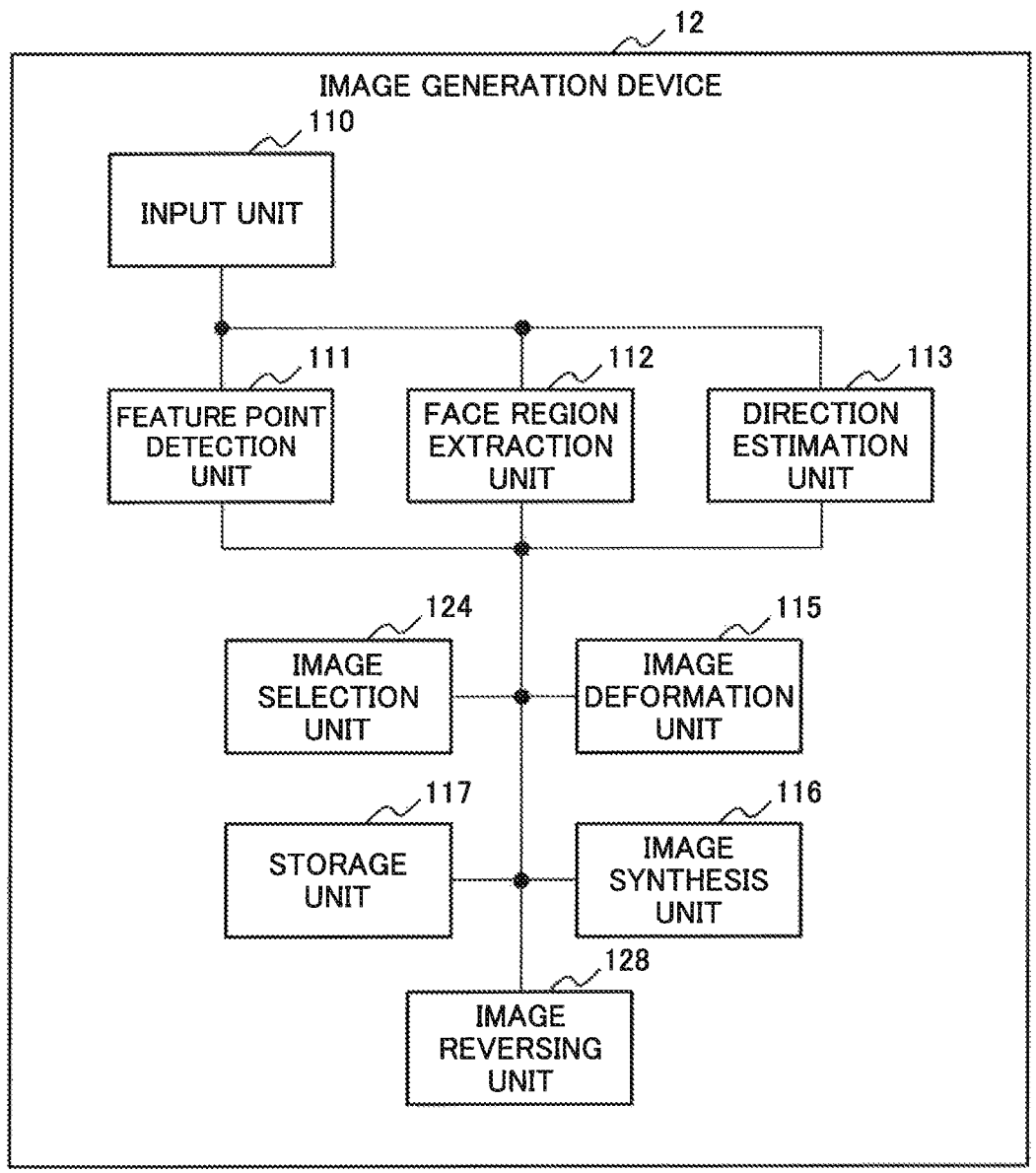
FIG. 14 is a block diagram illustrating a configuration of an image generation device according to a second example embodiment.

An image generation device 12 according to the second example embodiment is described. FIG. 14 is a block diagram illustrating a configuration of the image generation device 12. The image generation device 12 is different from the image generation device 11 in that the image generation device 12 includes an image selection unit 124 having functions extended from the functions of the image selection unit 114 and an image reversing unit 128. Since the functions and operations of the other elements except for the image selection unit 124 and the image reversing unit 128 are similar to those of the elements of the image generation device 11, a detailed description thereof is omitted below.

DESCRIPTION OF CONFIGURATION

The image selection unit 124 selects a material image appropriate for synthesis from a plurality of material images. At the time of the selection, the image selection unit 124 computes similarity between direction information of a target person and direction information associated with the material image. In such a case, the image selection unit 124 may also use direction information, which is obtained by horizontally reversing one of the two pieces of direction information, as the direction information to be used in computing the similarity.

For example, the image selection unit 124 also compares the direction information of the target person with the direction information obtained by horizontally reversing the direction information associated with the material image. For example, the image selection unit 124 also compares the direction information of the target person with direction information obtained by reversing the positive and negative values of a yaw angle of the direction information associated with the material image. Alternatively, in contrast, the image selection unit 124 may also compare direction information obtained by reversing the positive and negative values of a yaw angle of the direction information of the target person with direction information associated with each material image. By so doing, the image selection unit 124 may select a material image on the basis of direction information obtained by horizontally reversing a target face image or a material image.

When the direction of a face associated with the selected material image becomes similar to that of a face of the target person through horizontal reversing, the image selection unit 124 transmits a reversal instruction indicating "horizontally reversing the material image" to the image reversing unit 128. That is, in the case of selecting a material image associated with information of a direction becoming similar to that of a face included in the target face image at the time of horizontal reversing, the image selection unit 124 transmits the reversal instruction to the image reversing unit 128.

When the reversal instruction is received, the image reversing unit 128 horizontally reverses the material image indicated by the reversal instruction. An image generated by the reverse processing is a material image to be used in the process subsequent to step S35.

DESCRIPTION OF OPERATION

Figure 15:
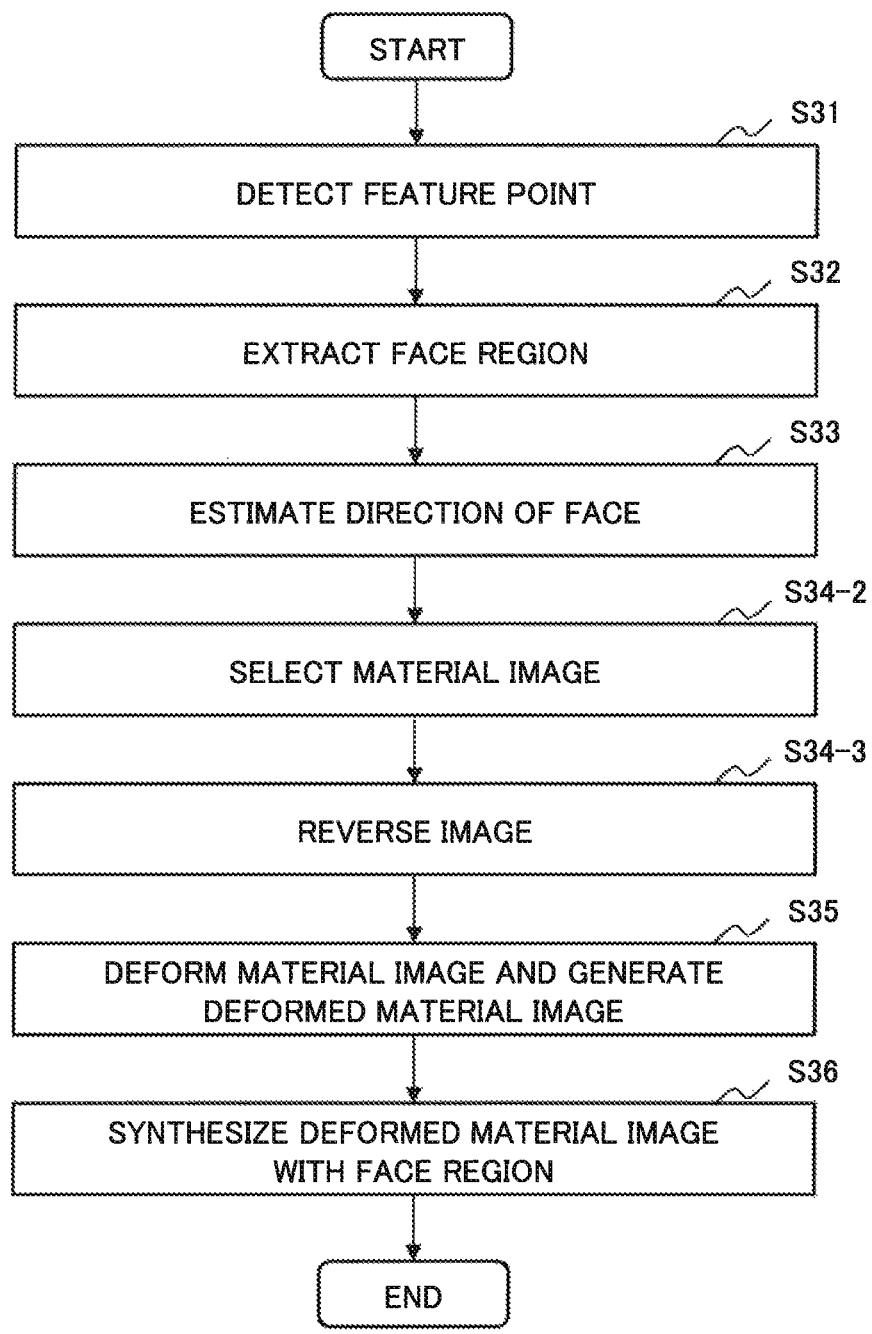
FIG. 15 is a flowchart illustrating the flow of an operation of an image generation device according to a second example embodiment.

FIG. 15 is a flowchart illustrating the flow of the processing of the image generation device 12.

The flowchart illustrated in FIG. 15 is different from the flowchart illustrated in FIG. 3 in that step S34-2 and step S34-3 are included instead of step S34.

In step S34-2, the image selection unit 124 selects the material image appropriate for synthesis from the plurality of material images. At the time of the selection, the image selection unit 124 computes similarity between the direction information of the target person and the direction information associated with the material image. In such a case, the image selection unit 124 also compares the direction information of the target person with direction information obtained by horizontally reversing the direction information associated with the material image (reversing the positive and negative values of a yaw angle). That is, the image selection unit 124 may also select the material image on the basis of the direction information obtained by horizontally reversing the direction information.

When the image selection unit 124 selects the material image because the direction information subjected to the horizontal reversing is similar to that of the target face image, the image selection unit 124 generates a reversal instruction and transmits the selected material image and the reversal instruction to the image reversing unit 128.

In step S34-3, when the reversal instruction is received, the image reversing unit 128 horizontally inverts the material image. The image reversing unit 128, for example, may change various values, which are associated with coordinates, of pairs of pixels in a mirror image relation by using a straight line parallel to a longitudinal direction of the material image as an axis, the straight line equally dividing the material image.

The image reversing unit 128 also corrects information on feature points in the material image. That is, the image reversing unit 128 horizontally reverses coordinates of the feature points. Furthermore, the image reversing unit 128 corrects a correspondence relation between the feature points and feature points in the target face image. For example, the image reversing unit 128 rewrites information by setting feature points, which have been originally extracted as feature points of the left eye, as feature points of the right eye.

The reversal performed by the image reversing unit 128 is not limited to the aforementioned method. For example, the reversal performed by the image reversing unit 128 may not be the horizontal reversal. For example, the image reversing unit 128 may reverse an image with a non-vertical line as an axis depending on a shape of a material image or a direction of a face. In such a case, the line serving as the axis may not always be a line that equally divides the material image.

Furthermore, the image reversing unit 128 may perform adjustment such as rotation with respect to the reversed image.

The material image reversed as above and information on the corrected feature points are used in the step subsequent to step S35.

Effects

In accordance with the image generation device 12 according to the second example embodiment, it is possible to increase a variation of a synthetic image as compared with the image generation device 11 according to the first example embodiment. In other words, even when there is a small variation in the direction of a material image, the image generation device 12 can generate a high quality synthetic image.

For example, in the case of the first example embodiment, when the direction of the face of the target person is rightward, a material image available in synthesis is limited to material images including a right-facing face. On the other hand, in the case of the second example embodiment, since the image reversing unit 128 reverses a material image, a material image including a left-facing face may also be a candidate of material images that can be synthesized. That is, the number of selectable material images is not limited to the material images including the right-facing face.

Main Elements

Figure 16:
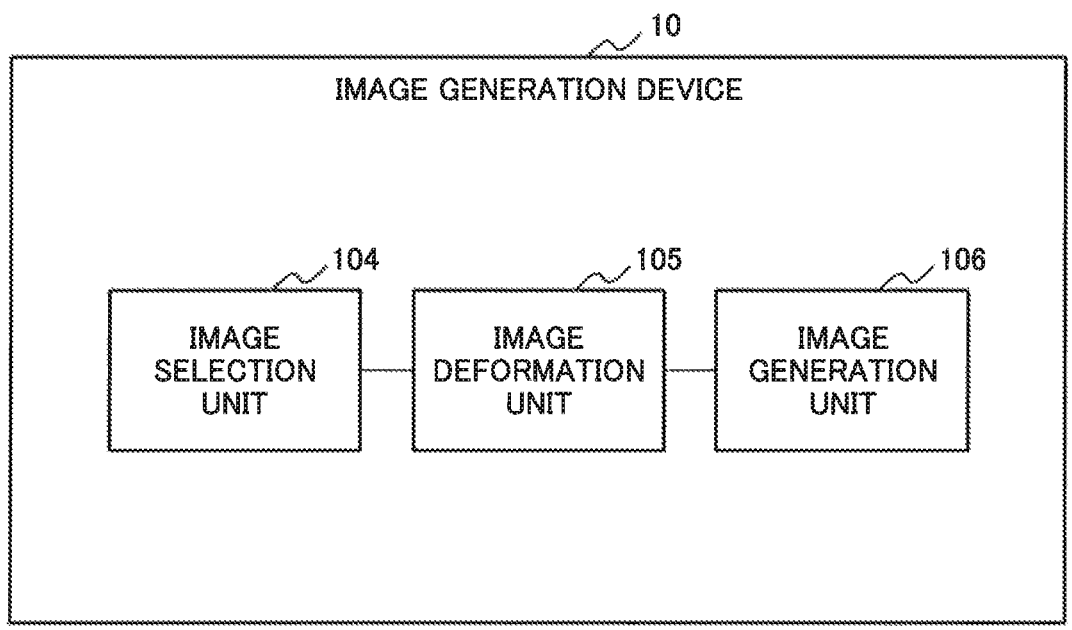
FIG. 16 is a block diagram illustrating a configuration of an image generation device according to an example embodiment.

Main elements of an example embodiment are described. FIG. 16 is a block diagram illustrating a configuration of an image generation device 10 according to an example embodiment. The image generation device 10 includes an image selection unit 104, an image deformation unit 105, and an image generation unit 106.

Figure 17:
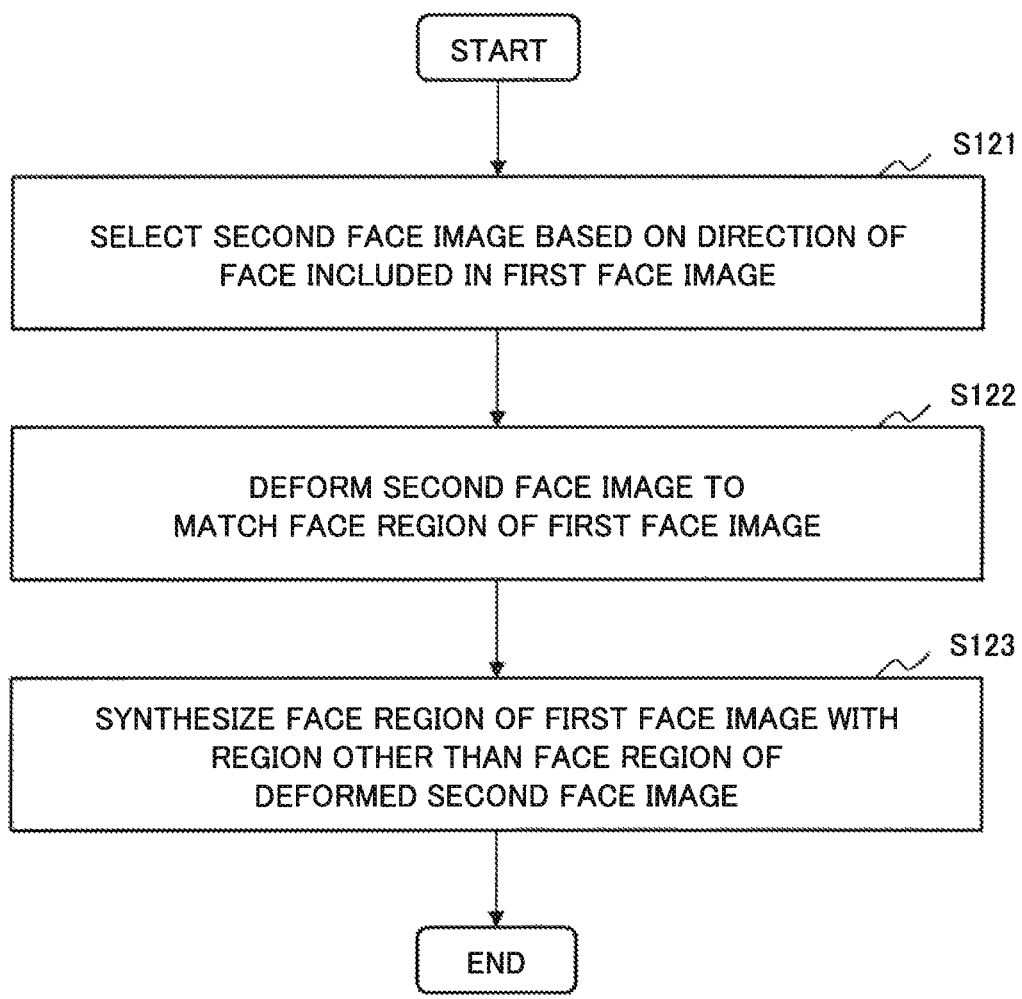
FIG. 17 is a flowchart illustrating the flow of an operation of an image generation device according to an example embodiment.

The functions of each element and processing flow of the image generation device 10 are described along a flowchart of FIG. 17.

On the basis of the directions of faces included in a plurality of face images stored in advance and the direction of a face included in an input first face image, the image selection unit 104 selects a second face image from the plurality of face images (step S121).

An example of the image selection unit 104 is the image selection unit 114 in the aforementioned each example embodiment. The first face image corresponds to the target face image in the aforementioned each example embodiment. An example of the plurality of face images stored in advance is the material images in the aforementioned each example embodiment.

On the basis of feature points of the face included in the first face image and feature points of a face included in the second face image, the image deformation unit 105 deforms the second face image to match a face region of the first face image (step S122). The "face region of the first face image", for example, is a region defined by a plurality of feature points in the first face image. The "matching the face region of the first face image", for example, represents that the face region of the first face image can be naturally synthesized while maintaining its features. For example, the image deformation unit 105 deforms a part or the whole of the second face image such that the face region of the first face image has a shape that can be fitted without nonlinear transformation. As a specific example thereof, for example, the image deformation unit 105 deforms a part or the whole of the second face image such that the positions of feature points in the second face image after being deformed, which are correlated with the plurality of feature points defining the face region of the aforementioned first face image, coincide with the positions of the plurality of feature points defining the face region of the aforementioned first face image. By the aforementioned deformation, a part of the second face image may be trimmed.

An example of the image deformation unit 105 is the image deformation unit 115 in the aforementioned each example embodiment. The image generation unit 106 synthesizes the face region of the first face image with a region other than the face region of the second face image deformed by the image deformation unit 105 (step S123). A face image generated by this synthesis is a third face image.

An example of the image generation unit 106 is the image synthesis unit 116 in the aforementioned each example embodiment.

In accordance with the image generation device 10, it is possible to generate an image in which a part other than a face is naturally synthesized without impairing the features of the face included in an input face image. This is because the second face image selected by the image selection unit 114 on the basis of the directions of the faces is deformed by the image deformation unit 105 so as to match the face region of the input face image, and the deformed second face image is synthesized with the face region of the input face image by the image generation unit 106.

Second Main Elements

Figure 18:
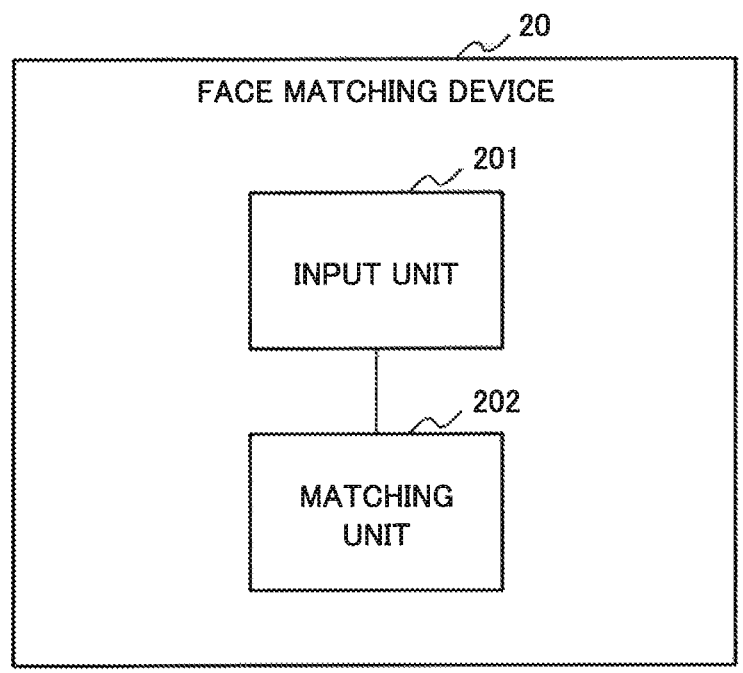
FIG. 18 is a block diagram illustrating a configuration of a face matching device according to an example embodiment.

FIG. 18 is a block diagram illustrating a configuration of a face matching device 20 according to an example embodiment. The face matching device 20 includes an input unit 201 and a matching unit 202.

The input unit 201 receives a face image as input.

The matching unit 202 performs matching of the aforementioned third face image with the input face image.

The third face image may not be always generated by the image generation device 10. That is, the third face image may be an image generated through the following steps.

Step in which the second face image is selected from a plurality of face images on the basis of the direction of the face included in the first face image Step in which the second face image is deformed on the basis of the feature points of the face included in the first face image and the feature points of the face included in the second face image such that the face region of the second face image matches the face region of the first face image Step in which the third face image is generated by synthesizing the face region of the first face image with a region other than the face region of the deformed second face image The present face matching device 20 can perform face matching with higher accuracy. This is because face matching is performed using the third face image in which the second face image has been synthesized while retaining the features of the first face image.

Configuration of Hardware for Achieving Elements of Example Embodiments

In each example embodiment of the present invention described above, components of each device indicate blocks on a functional basis.

The processing of each element may be performed, for example, by a computer system reading and executing a program stored in a computer-readable storage medium. The program may cause the computer system to perform the processing. The "computer-readable storage medium" indicates a portable medium such as an optical disc, a magnetic disc, a magneto-optical disc, and a nonvolatile semiconductor memory, and a storage device such as a read only memory (ROM) and a hard disk embedded in the computer system. The "computer-readable recording medium" also includes a medium for dynamically holding a program for a short time period such as a communication line in the case in which the program is transmitted via a network such as the Internet or a communication line such as a telephone line, and a medium for temporarily holding the program such as a volatile memory in the computer system serving as a server or a client in that case. The aforementioned program may also be a program for performing some of the aforementioned functions, or a program capable of performing the aforementioned functions in combination with a program previously stored in the computer system.

Figure 19:
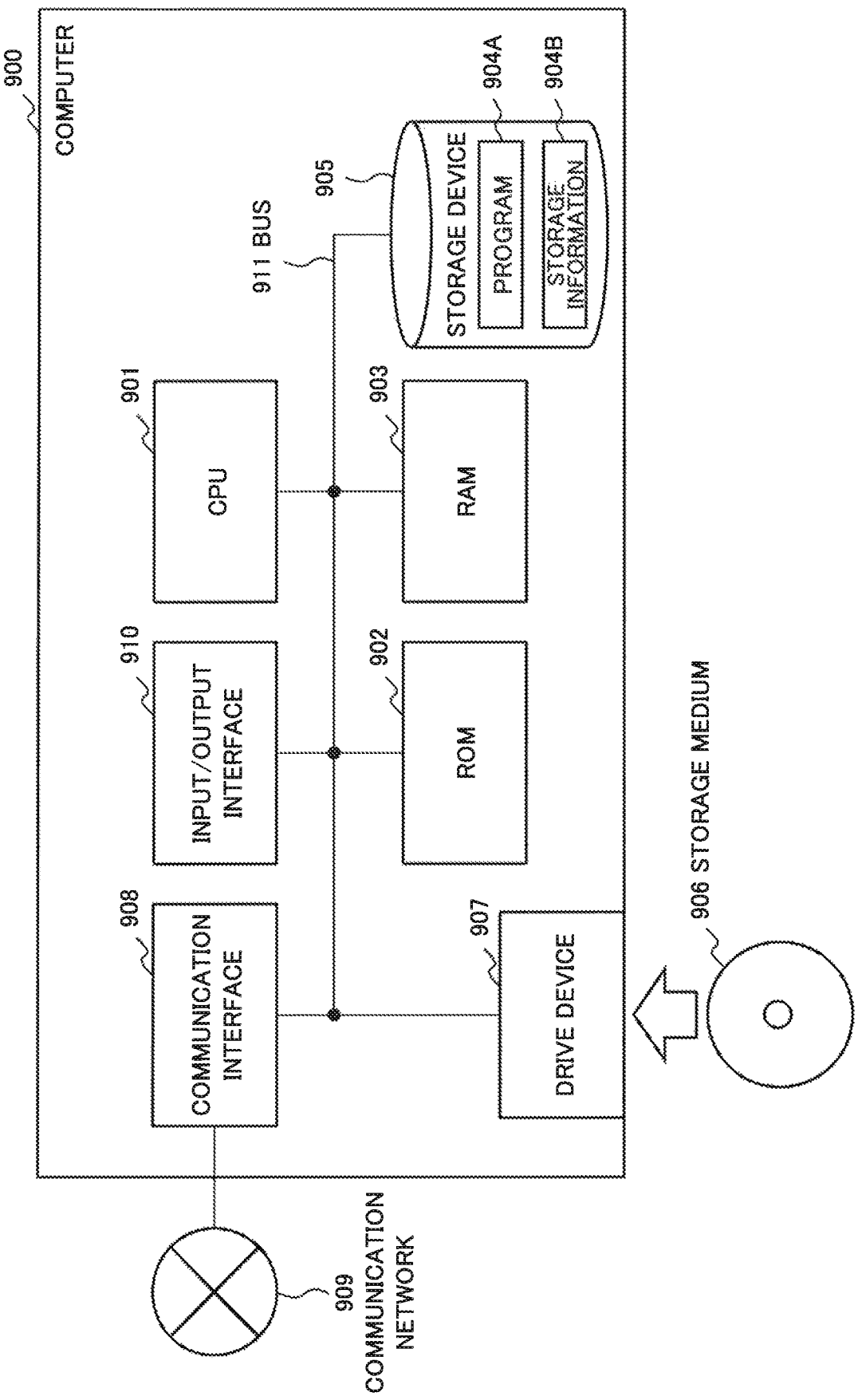
FIG. 19 is a block diagram illustrating an example of hardware that achieves units according to example embodiments.

The "computer system" is, for example, a system including a computer 900 illustrated in FIG. 19. The computer 900 includes the following elements.

a central processing unit (CPU) 901
a read only memory (ROM) 902
a random access memory (RAM) 903
a program 904A and stored information 904B loaded to the RAM 903
a storage device 905 storing the program 904A and stored information 904B
a drive device 907 reading and writing from and to a recording medium 906
a communication interface 908 connected with a communication network 909
an input/output interface 910 inputting and outputting data
a bus 911 connecting the respective components Components of each device according to each example embodiment are achieved by loading, into the RAM 903, and executing, by the CPU 901, the program 904A for achieving functions thereof. The program 904A for achieving the functions of the components of each device is stored in, for example, the storage device 905 or in the ROM 902 in advance. The CPU 901 reads the program as needed. The program 904A may be supplied to the CPU 901 via the communication network 909, or the program stored in the recording medium 906 in advance may be read by the drive device 907 and supplied to the CPU 901. The recording medium 906 may be, for example, a portable medium such as an optical disc, a magnetic disc, a magneto-optical disc, and a nonvolatile semiconductor memory.

There are various modification examples of a method of implementing each device. For example, each of the devices may be achieved by applicable combinations of the computer 1900 and a program individually implemented for each component. Further, a plurality of components included in the device may be achieved by an applicable combination of one computer 1900 and a program.

Some or all of components of each device are implemented by another general-purpose or dedicated circuit, a computer, or the like, or by a combination thereof. These components may be achieved by a single chip, or may be achieved by a plurality of chips connected via a bus.

When some or all of components of each device are implemented by a plurality of computers, circuits, or the like, the plurality of computers, circuits, or the like may be centralizedly arranged, or may be dispersedly arranged. For example, computers, circuits, or the like may be implemented as a mode, such as a client and server system or a cloud computing system, in which the computers, circuits, or the like are mutually connected via a communication network.

The present invention is not limited to the above-described embodiments. Those of ordinary skill in the art may make variously changes in form and details of the above-described embodiments within scope of the present invention.

All or part of the example embodiments described above may be described as in the following supplementary notes, but the present invention is not limited thereto.

Supplementary Note 1

An image generation device including:

image selection means for selecting a second face image from a plurality of face images stored in advance based on directions of faces included in the plurality of face images and a direction of a face included in an input first face image;

image deformation means for deforming the second face image based on feature points of the face included in the first face image and feature points of a face included in the second face image such that a face region of the second face image matches a face region of the first face image; and image generation means for generating a third face image in which the face region of the first face image is synthesized with a region other than the face region of the deformed second face image.

Supplementary Note 2

The image generation device according to Supplementary Note 1, wherein the image deformation means deforms the second face image such that at least the face region of the second face image has a shape to be fitted without nonlinear transformation of the face region of the first face image.

Supplementary Note 3

The image generation device according to Supplementary Note 2, wherein the image deformation means includes:

parameter estimation means for estimating a geometric transformation parameter for projecting points of the first face image to points of the second face image based on a correspondence relation between the feature points of the first face image and the feature points of the second face image;

projected perimeter point generation means for projecting perimeter points on a perimeter of the first face image onto the second face image by using the geometric transformation parameter estimated by the parameter estimation means; and precise-conversion means for converting the second face image such that a shape of a region surrounded by a perimeter line of the face region of the second face image and a line, which is formed based on the perimeter points projected onto the second face image by the projected perimeter point generation means, becomes a shape of a region surrounded by a perimeter line of the face region of the first face image and a line formed based on the perimeter points of the first face image.

Supplementary Note 4

The image generation device according to any one of Supplementary Notes 1 to 3, wherein the image selection means selects the second face image from face images, in which similarity of values of parameters representing the directions of the faces of the plurality of face images with respect to a value of a parameter representing the direction of the face included in the first face image is within a predetermined reference.

Supplementary Note 5

The image generation device according to any one of Supplementary Notes 1 to 4, wherein the image selection means selects the second face image from the plurality of face images based on a distribution of brightness within the face region of the first face image and a distribution of brightness within respective face regions of the plurality of face images.

Supplementary Note 6

The image generation device according to any one of Supplementary Notes 1 to 5, wherein the image selection means selects, based on not only the directions of the faces included in the plurality of face images but also a result obtained by comparing directions of faces when the plurality of face images are horizontally reversed with the direction of the face included in the first face image in the selection of the second face image, at least one of the plurality of face images and the plurality of face images horizontally reversed as the second face image.

Supplementary Note 7

The image generation device according to any one of Supplementary Notes 1 to 6, wherein the direction of the face is defined by three rotation angles of a rotation angle around right and left axes, a rotation angle around upper and lower axes, and a rotation angle around front and rear axes when a direction of a front-facing face is employed as a reference, and the image selection means selects the second face image from the plurality of face images by comparing the rotation angle around right and left axes and the rotation angle around upper and lower axes with each other between the faces included in the plurality of face images and the face included in the first face image.

Supplementary Note 8

The image generation device according to any one of Supplementary Notes 1 to 7, wherein the face region is a closed region formed by interconnecting feature points positioned on an outside of eyes, a nose, and a mouth and including the eyes, the nose, and the mouth.

Supplementary Note 9

An image generation method including:
selecting a second face image from a plurality of face images stored in advance based on directions of faces included in the plurality of face images and a direction of a face included in an input first face image;
deforming the second face image based on feature points of the face included in the first face image and feature points of a face included in the second face image such that a face region of the second face image matches a face region of the first face image; and
generating a third face image in which the face region of the first face image is synthesized with a region other than the face region of the deformed second face image.

Supplementary Note 10

The image generation method according to Supplementary Note 9, wherein the deforming the second face image includes deforming the second face image such that at least the face region of the second face image has a shape to be fitted without nonlinear transformation of the face region of the first face image.

Supplementary Note 11

The image generation method according to Supplementary Note 10, wherein the deforming the second face image includes:
estimating a geometric transformation parameter for projecting points of the first face image to points of the second face image based on a correspondence relation between the feature points of the first face image and the feature points of the second face image;
projecting perimeter points on a perimeter of the first face image onto the second face image by using the estimated geometric transformation parameter; and
converting the second face image such that a shape of a region surrounded by a perimeter line of the face region of the second face image and a line, which is formed based on the perimeter points projected onto the second face image, becomes a shape of a region surrounded by a perimeter line of the face region of the first face image and a line formed based on the perimeter points of the first face image.

Supplementary Note 12

The image generation method according to any one of Supplementary Notes 9 to 11, wherein the selecting includes selecting the second face image from face images, in which similarity of values of parameters representing the directions of the faces of the plurality of face images with respect to a value of a parameter representing the direction of the face included in the first face image is within a predetermined reference.

Supplementary Note 13

The image generation method according to any one of Supplementary Notes 9 to 12, wherein the selecting includes selecting the second face image from the plurality of face images based on a distribution of brightness within the face region of the first face image and a distribution of brightness within respective face regions of the plurality of face images.

Supplementary Note 14

The image generation method according to any one of Supplementary Notes 9 to 13, wherein the selecting includes selecting, based on not only the directions of the faces included in the plurality of face images but also a result obtained by comparing directions of faces when the plurality of face images are horizontally reversed with the direction of the face included in the first face image in the selection of the second face image, at least one of the plurality of face images and the plurality of face images horizontally reversed as the second face image.

Supplementary Note 15

The image generation method according to any one of Supplementary Notes 9 to 14, wherein
the direction of the face is defined by three rotation angles of a rotation angle around right and left axes, a rotation angle around upper and lower axes, and a rotation angle around front and rear axes when a direction of a front-facing face is employed as a reference, and
the selecting includes selecting the second face image from the plurality of face images by comparing the rotation angle around right and left axes and the rotation angle around upper and lower axes with each other between the faces included in the plurality of face images and the face included in the first face image.

Supplementary Note 16

The image generation method according to any one of Supplementary Notes 9 to 15, wherein the face region is a closed region formed by interconnecting feature points positioned on an outside of eyes, a nose, and a mouth and including the eyes, the nose, and the mouth.

Supplementary Note 17

A program causing a computer to execute:
image selection processing of selecting a second face image from a plurality of face images stored in advance based on directions of faces included in the plurality of face images and a direction of a face included in an input first face image;
image deformation processing of deforming the second face image based on feature points of the face included in the first face image and feature points of a face included in the second face image such that a face region of the second face image matches a face region of the first face image; and
image generation processing of generating a third face image in which the face region of the first face image is synthesized with a region other than the face region of the deformed second face image.

Supplementary Note 18

The program according to Supplementary Note 17, wherein the image deformation processing deforms the second face image such that at least the face region of the second face image has a shape to be fitted without nonlinear transformation of the face region of the first face image.

Supplementary Note 19

The program according to Supplementary Note 18, wherein the image deformation processing includes:
parameter estimation processing of estimating a geometric transformation parameter for projecting points of the first face image to points of the second face image based on a correspondence relation between the feature points of the first face image and the feature points of the second face image;
projected perimeter point generation processing of projecting perimeter points on a perimeter of the first face image onto the second face image by using the geometric transformation parameter estimated by the parameter estimation means; and
precise-conversion processing of converting the second face image such that a shape of a region surrounded by a perimeter line of the face region of the second face image and a line, which is formed based on the perimeter points projected onto the second face image by the projected perimeter point generation processing, becomes a shape of a region surrounded by a perimeter line of the face region of the first face image and a line formed based on the perimeter points of the first face image.

Supplementary Note 20

The program according to any one of Supplementary Notes 17 to 19, wherein the image selection processing selects the second face image from face images, in which similarity of values of parameters representing the directions of the faces of the plurality of face images with respect to a value of a parameter representing the direction of the face included in the first face image is within a predetermined reference.

Supplementary Note 21

The program according to any one of Supplementary Notes 17 to 20, wherein the image selection processing selects the second face image from the plurality of face images based on a distribution of brightness within the face region of the first face image and a distribution of brightness within respective face regions of the plurality of face images.

Supplementary Note 22

The program according to any one of Supplementary Notes 17 to 21, wherein the image selection processing selects, based on not only the directions of the faces included in the plurality of face images but also a result obtained by comparing directions of faces when the plurality of face images are horizontally reversed with the direction of the face included in the first face image in the selection of the second face image, at least one of the plurality of face images and the plurality of face images horizontally reversed as the second face image.

Supplementary Note 23

The program according to any one of Supplementary Notes 17 to 22, wherein the direction of the face is defined by three rotation angles of a rotation angle around right and left axes, a rotation angle around upper and lower axes, and a rotation angle around front and rear axes when a direction of a front-facing face is employed as a reference, and
the image selection processing selects the second face image from the plurality of face images by comparing the rotation angle around right and left axes and the rotation angle around upper and lower axes with each other between the faces included in the plurality of face images and the face included in the first face image.

Supplementary Note 24

The program according to any one of Supplementary Notes 17 to 23, wherein the face region is a closed region formed by interconnecting feature points positioned on an outside of eyes, a nose, and a mouth and including the eyes, the nose, and the mouth.

Supplementary Note 25

A computer readable storage medium storing the program according to any one of Supplementary Notes 17 to 24.

Supplementary Note 26

A face matching device including:
input means for receiving a face image as input; and
matching means for performing matching a third face image with the face image received as the input, the third face image generated by synthesizing a face region of a first face image with a region other than a face region of a second face image deformed to match the face region of the first face image based on feature points of a face included in the first face image and feature points of a face included in the second face image, the second face image being selected from a plurality of face images stored in advance based on directions of faces included in the plurality of face images and a direction of the face included in the first face image.

REFERENCE SIGNS LIST

10-12 image generation device
20 face matching device
104 image selection unit
105 image deformation unit
106 image generation unit
110 input unit
111 feature point detection unit
112 face region extraction unit
113 direction estimation unit
114 image selection unit
115 image deformation unit
1151 parameter estimation unit
1152 projected perimeter point generation unit
1153 precise-conversion unit 116 image synthesis unit
117 storage unit
124 image selection unit
128 image reversing unit
201 input unit
202 matching unit
900 computer
901 CPU
902 ROM
903 RAM
904A program 904B stored information
905 storage device
906 recording medium
907 drive device
908 communication interface
909 communication network
910 input/output interface
911 bus

The invention claimed is:

1. An image processing device comprising:
    at least one memory storing a set of instructions; and
    at least one processor configured to execute the set of instructions to:
    deform a face region of a second face image based on feature points of a face included in an input first face image and feature points of a face included in the second face image such that the face region of the second face image matches a face region of the first face image; and
    generate a third face image in which the face region of the first face image is synthesized with a region other than the face region of the deformed second face image.

2. The image processing device according to claim 1, wherein the at least one processor is configured to select the second face image from a plurality of face images stored in advance based on directions of faces included in the plurality of face images and a direction of the face included in the first face image.

3. The image processing device according to claim 1, wherein the at least one processor is configured to deform the second face image such that at least the face region of the second face image has a shape to be fitted without nonlinear transformation of the face region of the first face image.

4. The image processing device according to claim 3, wherein the at least one processor is further configured to:
    estimate a geometric transformation parameter for projecting points of the first face image to points of the second face image based on a correspondence relation between the feature points of the first face image and the feature points of the second face image;
    project perimeter points on a perimeter of the first face image onto the second face image by using the geometric transformation parameter estimated by the parameter estimation means; and
    convert the second face image such that a shape of a region surrounded by a perimeter line of the face region of the second face image and a line, which is formed based on the perimeter points projected onto the second face image, becomes a shape of a region surrounded by a perimeter line of the face region of the first face image and a line formed based on the perimeter points of the first face image.

5. The image processing device according to claim 1, wherein the at least one processor is configured to select the second face image from face images, in which similarity of values of parameters representing the directions of the faces of the plurality of face images with respect to a value of a parameter representing the direction of the face included in the first face image is within a predetermined reference.

6. The image generation device according to claim 1, wherein the at least one processor is configured to select the second face image from the plurality of face images based on a distribution of brightness within the face region of the first face image and a distribution of brightness within respective face regions of the plurality of face images.

7. The image processing device according to claim 1, wherein the at least one processor is configured to select, based on not only the directions of the faces included in the plurality of face images but also a result obtained by comparing directions of faces when the plurality of face images are horizontally reversed with the direction of the face included in the first face image in the selection of the second face image, at least one of the plurality of face images and the plurality of face images horizontally reversed as the second face image.

8. The image processing device according to claim 1, wherein
    the direction of the face is defined by three rotation angles of a rotation angle around right and left axes, a rotation angle around upper and lower axes, and a rotation angle around front and rear axes when a direction of a front-facing face is employed as a reference, and
    the at least one processor is configured to select the second face image from the plurality of face images by comparing the rotation angle around right and left axes and the rotation angle around upper and lower axes with each other between the faces included in the plurality of face images and the face included in the first face image.

9. The image processing device according to claim 1, wherein the face region is a closed region formed by interconnecting feature points positioned on an outside of eyes, a nose, and a mouth and including the eyes, the nose, and the mouth.

10. An image processing method comprising:
    deforming a face region of a second face image based on feature points of a face included in an input first face image and feature points of a face included in the second face image such that the face region of the second face image matches a face region of the first face image; and
    generating a third face image in which the face region of the first face image is synthesized with a region other than the face region of the deformed second face image.

11. The image processing method according to claim 10, further comprising selecting the second face image from a plurality of face images stored in advance based on directions of faces included in the plurality of face images and a direction of the face included in the first face image.

12. The image processing method according to claim 10, further comprising deforming the second face image such that at least the face region of the second face image has a shape to be fitted without nonlinear transformation of the face region of the first face image.

13. The image processing method according to claim 12, further comprising:
    estimating a geometric transformation parameter for projecting points of the first face image to points of the second face image based on a correspondence relation between the feature points of the first face image and the feature points of the second face image;
    projecting perimeter points on a perimeter of the first face image onto the second face image by using the geometric transformation parameter estimated by the parameter estimation means; and
    converting the second face image such that a shape of a region surrounded by a perimeter line of the face region of the second face image and a line, which is formed based on the perimeter points projected onto the second face image, becomes a shape of a region surrounded by a perimeter line of the face region of the first face image and a line formed based on the perimeter points of the first face image.

14. The image processing method according to claim 10, further comprising selecting the second face image from face images, in which similarity of values of parameters representing the directions of the faces of the plurality of face images with respect to a value of a parameter representing the direction of the face included in the first face image is within a predetermined reference.

15. The image processing method according to claim 10, further comprising selecting the second face image from the plurality of face images based on a distribution of brightness within the face region of the first face image and a distribution of brightness within respective face regions of the plurality of face images.

16. The image processing method according to claim 10, further comprising selecting, based on not only the directions of the faces included in the plurality of face images but also a result obtained by comparing directions of faces when the plurality of face images are horizontally reversed with the direction of the face included in the first face image in the selection of the second face image, at least one of the plurality of face images and the plurality of face images horizontally reversed as the second face image.

17. The image processing method according to claim 10, wherein
the direction of the face is defined by three rotation angles of a rotation angle around right and left axes, a rotation angle around upper and lower axes, and a rotation angle around front and rear axes when a direction of a front-facing face is employed as a reference, and
the method further comprises selecting the second face image from the plurality of face images by comparing the rotation angle around right and left axes and the rotation angle around upper and lower axes with each other between the faces included in the plurality of face images and the face included in the first face image.

18. The image processing method according to claim 10, wherein the face region is a closed region formed by interconnecting feature points positioned on an outside of eyes, a nose, and a mouth and including the eyes, the nose, and the mouth.

19. A non-transitory computer readable storage medium storing a program causing a computer to execute:
image deformation processing of deforming a face region of a second face image based on feature points of a face included in an input first face image and feature points of a face included in the second face image such that the face region of the second face image matches a face region of the first face image; and
image generation processing of generating a third face image in which the face region of the first face image is synthesized with a region other than the face region of the deformed second face image.

20. The non-transitory computer-readable storage medium according to claim 19, the program causing a computer to further execute image selection processing of selecting the second face image from a plurality of face images stored in advance based on directions of faces included in the plurality of face images and a direction of a face included in the first face image.

* * * * *